United States Patent
Plawecki et al.

(10) Patent No.: US 12,296,978 B1
(45) Date of Patent: May 13, 2025

(54) SYSTEMS AND METHODS FOR AERIAL VEHICLE MISSION AND MAINTENANCE PLANNING

(71) Applicants: Nathan D. Plawecki, Melbourne, FL (US); Kenneth A. Crooks, Melbourne, FL (US); Angel A. Lopez De Victoria, Melbourne, FL (US); David M. Wernert, Melbourne, FL (US)

(72) Inventors: Nathan D. Plawecki, Melbourne, FL (US); Kenneth A. Crooks, Melbourne, FL (US); Angel A. Lopez De Victoria, Melbourne, FL (US); David M. Wernert, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 407 days.

(21) Appl. No.: 17/218,336

(22) Filed: Mar. 31, 2021

(51) Int. Cl.
*B64D 45/00* (2006.01)
*G06N 5/04* (2023.01)
(Continued)

(52) U.S. Cl.
CPC ............ *B64D 45/00* (2013.01); *G06N 5/04* (2013.01); *G06N 20/00* (2019.01); *G07C 5/008* (2013.01); *G07C 5/0808* (2013.01)

(58) Field of Classification Search
CPC .......... B64D 45/00; G06N 5/04; G06N 20/00; G07C 5/008; G07C 5/0808
USPC ............ 701/31.4, 1, 33.4, 29.1, 31.5, 2, 36, 701/329.6, 33.2, 29.3, 34.4, 14, 29.4, 701/34.3, 117, 32.3, 50, 123, 32.7, 32.4,
(Continued)

(56) References Cited

U.S. PATENT DOCUMENTS 10,124,893 B1 * 11/2018 Aalund ................ G07C 5/006
10,810,501 B1 * 10/2020 Kimchi .................. G08G 5/57
(Continued)

OTHER PUBLICATIONS

UTC Aerospace Systems: Health and Usage Management Systems (HUMS): found Mar. 31, 2021 at https://utcaerospacesystems.com/wp-content/uploads/2018/04/Health-and-Usage-Management-Systems-HUMS.pdf.
(Continued)

*Primary Examiner* — Anne Marie Antonucci
*Assistant Examiner* — Jodi Jones
(74) *Attorney, Agent, or Firm* — Tarolli, Sundheim, Covell & Tummino LLP

(57) ABSTRACT

Systems and methods are disclosed herein for influencing mission planning, vehicle maintenance, and identifying an aerial vehicle that provide a greatest probability of mission success. In some examples, a dynamic reliability model of dynamic reliability models can be updated based on at least component reliability data indicative of a reliability of a component of the aerial vehicle of aerial vehicles. Each dynamic reliability model can characterize a reliability of one of the aerial vehicles. Each dynamic reliability model can be executed to compute an indication of vehicle reliability for each aerial vehicle. A mission of success probability for each aerial vehicle can be computed based on a respective indication of vehicle reliability. A given aerial vehicle of the aerial vehicles can be identified for implementing the mission based on an evaluation of the mission of success probability for each aerial vehicle of the aerial vehicles.

20 Claims, 7 Drawing Sheets

(51) Int. Cl.
  *G06N 20/00* (2019.01)
  *G07C 5/00* (2006.01)
  *G07C 5/08* (2006.01)

(58) Field of Classification Search
  USPC ....... 701/23, 99, 22, 29.2, 45, 468, 31.6, 24,
    701/33.9, 32.2, 31.9, 32.8, 408, 32.1,
    701/33.7, 300, 32.6, 33.6, 34.2, 517, 532,
    701/29.5, 31.7, 102, 469, 114, 301, 31.8,
    701/70, 32.5, 484, 49, 51, 16, 33.3, 115,
    701/29.7, 33.1, 32.9, 4, 48, 533, 118,
    701/101, 400, 119, 120, 25, 93, 19, 519,
    701/26, 521, 21, 27, 33.8, 37, 482, 9, 41,
    701/100, 516, 431, 409, 424, 410, 411,
    701/103, 28, 30.5, 537, 15, 414, 527,
    701/113, 423, 538, 13, 29.9, 30.8, 33.5,
    701/39, 11, 31.1, 454, 104, 124, 439,
    701/461, 515, 30.3, 425, 5, 59, 67, 29.8,
    701/30.6, 418, 43, 7, 30.9, 412, 42, 451,
    701/465, 47, 472, 54, 540, 30.4, 430, 46,
    701/467, 500, 66, 80, 108, 20, 30.2, 31.3,
    701/470, 487, 65, 82, 96, 110, 17, 30.1,
    701/31.2, 450, 486, 522, 57, 58, 10, 30.7,
    701/34.1, 38, 40, 444, 492, 514, 528, 6,
    701/68, 76, 8, 107, 109, 112, 121, 18,
    701/302, 417, 420, 422, 426, 432, 433,
    701/446, 453, 455, 462, 466, 475, 483,
    701/490, 491, 502, 508, 52, 520, 53, 541,
    701/62, 69, 74, 79, 84, 89, 92, 122, 415,
    701/428, 436, 438, 442, 481, 494, 495,
    701/526, 531, 64, 71, 98; 706/12, 46, 45,
    706/52, 11, 47, 20, 14, 25, 50, 48, 21, 13,
    706/15, 16, 54, 60, 55, 59, 62, 10, 58, 61,
    706/19, 53, 51, 56, 23, 1, 17, 18, 22, 900,
    706/924, 26, 911, 30, 8, 906, 919, 27, 4,
    706/57, 925, 49, 903, 34, 908, 921, 41,
    706/916, 2, 28, 31, 6, 904, 902, 912, 914,
    706/33, 44, 5, 927, 934, 29, 38, 40, 42,
    706/43, 9, 910, 913, 917, 918, 922, 37,
    706/905, 909, 932
  See application file for complete search history.

(56) References Cited

U.S. PATENT DOCUMENTS

| | | | | |
|---|---|---|---|---|
| 2002/0143421 | A1* | 10/2002 | Wetzer | G06Q 10/06315 700/100 |
| 2006/0271256 | A1* | 11/2006 | Siebel | G05B 23/0278 701/32.7 |
| 2014/0025414 | A1* | 1/2014 | Worden | G06Q 10/06 705/7.11 |
| 2016/0104123 | A1* | 4/2016 | Viswanath | G06F 16/245 705/305 |
| 2019/0315482 | A1* | 10/2019 | Gu | B64C 39/024 |
| 2020/0104730 | A1* | 4/2020 | Strong | G06Q 10/06 |
| 2022/0101733 | A1* | 3/2022 | Dunlay | G08G 5/30 |

OTHER PUBLICATIONS

MacConnell: "ISHM Design: A review of the benefits of the ideal ISHM system," 2007 IEEE Aerospace Conference, Big Sky, MT, 2007, pp. 1-18.

Nannapaneni, et al: "A model-based approach for reliability assessment in component-based systems." Proceedings of the annual conference of the Prognostics and Health Management Society. 2014.

Honeywell/Aerospace: "Health and Usage Monitoring Systems (HUMS)" found Mar. 31, 2021 at https://aerospace.honeywell.com/en/learn/products/health-and-usage-monitoring.

* cited by examiner

SYSTEMS AND METHODS FOR AERIAL VEHICLE MISSION AND MAINTENANCE PLANNING

TECHNICAL FIELD

The present disclosure relates to systems and methods for aerial vehicle mission and maintenance planning.

BACKGROUND

Fault tree analysis (FTA) is a top-down, deductive failure analysis in which an undesired state of a system is analyzed using Boolean logic to combine a series of lower-level events. FTA can be used in safety and reliability engineering to understand how systems fail, to identify the best ways to reduce risk, and to determine or identify event rates of a safety accident or a particular system level (functional) failure. A reliability block diagram (RBD) is a diagrammatic method for showing how component reliability contributes to a success or failure. An RBD is drawn as a series of blocks connected in parallel paths and/or series configuration. Each block can represent a component of the system with a success or failure rate. RBDs can indicate a type of redundancy in the parallel path. For example, a group of parallel blocks can require two out of three components to succeed for the system to succeed. By contrast, any failure along a series path can cause the entire series path to fail. An RBD may be converted to a success tree or a fault tree depending on how the RBD is defined. A success tree may then be converted to a fault tree for FTA or vice versa by applying de Morgan's theorem. To evaluate an RBD, closed-form solutions are available when blocks or components have statistical independence.

Machine learning is a subset of artificial intelligence in which a computer uses algorithms and statistical models to accurately perform tasks without using explicitly coded instructions after having analyzed a learning or training data set, in effect relying on patterns and inferences to generalize from past experiences. Machine learning-based systems can be capable of solving problems not previously seen or considered and for which it would not be possible to code for every individual case. Types of machine learning algorithms include, among others, supervised learning, unsupervised learning, and feature learning. Types of machine learning models that can be trained on the training data include artificial neural networks, decision trees, support vector machines, regression analysis models, Bayesian networks, principal components analysis, Markov decision process, and cluster analysis.

SUMMARY

The present disclosure relates to systems and methods for aerial vehicle mission and maintenance planning.

In an example, a computer-implemented method can include generating component reliability data indicative of a reliability of a component of an aerial vehicle of a plurality of aerial vehicles and updating a dynamic reliability model of a plurality of dynamic reliability models for the aerial vehicle based on the component reliability data. Each dynamic reliability model of the plurality of dynamic reliability models can characterize a reliability of one of the plurality of aerial vehicles. The computer-implemented method can further include executing each dynamic reliability model of the plurality of dynamic reliability models to compute an indication of vehicle reliability for each aerial vehicle of the plurality of aerial vehicles, computing a mission of success probability for each aerial vehicle of the plurality of aerial vehicles based on a respective indication of vehicle reliability, and identifying a given aerial vehicle of the plurality of aerial vehicles for implementing the mission based on an evaluation of the mission of success probability for each aerial vehicle of the plurality of aerial vehicles.

In yet another example, a system can include memory to store machine readable instructions and data. The data can include component reliability data indicative of a reliability of a component of an aerial vehicle of a plurality of aerial vehicles, factor biasing data indicative of an influence that weather had on the component during one or more flights by the aerial vehicle, and a plurality of dynamic reliability models characterizing a reliability of one of the plurality of aerial vehicles. The system can further include one or more processors to access the memory and execute the machine readable instructions. The machine readable instructions can include a model adjustment engine that can be programmed to update a dynamic reliability model of the plurality of dynamic reliability models for the aerial vehicle based on the component reliability data and the factor biasing data, a reliability calculator that can be programmed to execute each dynamic reliability model of the plurality of dynamic reliability models to compute an indication of vehicle reliability for each aerial vehicle of the plurality of aerial vehicles, and a mission engine that can be programmed to compute a mission of success probability for each aerial vehicle of the plurality of aerial vehicles based on a respective indication of vehicle reliability and identify a given aerial vehicle of the plurality of aerial vehicles for implementing the mission based on an evaluation of the mission of success probability for each aerial vehicle of the plurality of aerial vehicles.

In a further example, a computer-implemented method can include generating component reliability data indicative of a reliability of a component of an aerial vehicle of a plurality of aerial vehicles following one or more flights by the aerial vehicle, generating factor biasing data indicative of an influence that weather had on the component during the one or more flights by the aerial vehicle, and updating a dynamic reliability model of a plurality of dynamic reliability models for the aerial vehicle based on the component reliability data and the factor biasing data. Each dynamic reliability model of the plurality of dynamic reliability models can characterize a reliability of one of the plurality of aerial vehicles. The computer-implemented method can further include executing each dynamic reliability model of the plurality of dynamic reliability models to compute an indication of vehicle reliability for each aerial vehicle of the plurality of aerial vehicles, evaluating the indication of vehicle reliability for each aerial vehicle relative to a vehicle reliability threshold to identify a set of aerial vehicle of the aerial vehicles for the mission, and identifying a given aerial vehicle of the set aerial vehicles for implementing the mission.

DETAILED DESCRIPTION

Figure 1:
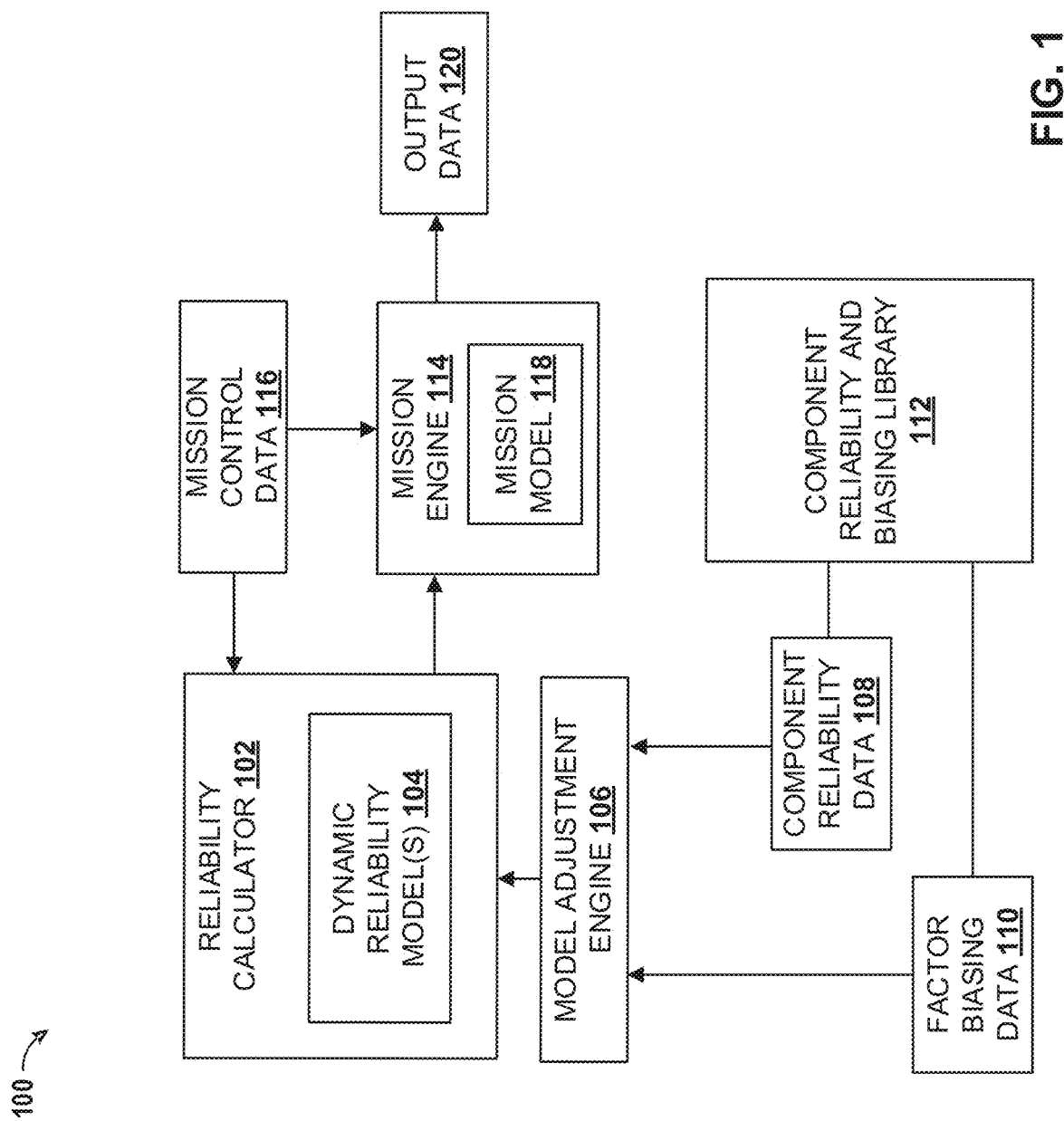
FIG. 1 is an example of a mission planning and maintenance system.

The present disclosure relates to systems and methods for aerial vehicle mission and maintenance planning. Complex modeling of reliability can be used to determine a probability of mission success or loss of a platform, such as aerial vehicles (e.g., manned or unmanned aerial vehicles). Existing complex modeling approaches provide a quantitative methodology for understanding how likely an aerial vehicle will be able to complete a mission, and thus establish or define an acceptable level of mission or safety risk. However, existing modeling techniques are only used in development that is in early stages and provide a static reliability model. During a sustainment phase of the aerial vehicle, the static reliability models remain unchanged and are not updated to reflect new information realized during use and/or deployment of the aerial vehicle. In some instances, technical performance measures (TPMs) such as Mean Time Between Failure (MTBF), Mission Critical Rate, and Availability metrics are available. These TPMs are derived from field recorded maintenance actions and are published for customer consumption based on a predetermined frequency defined by the program. TPMs are a snapshot in time restricting operations to a more reactive than a proactive construct. However, reported TPMs do not provide a user real time platform specific reliability, remaining useful life, and influences from mission type, exposure time, and other external factors.

Reliability modeling can use an exponential distribution that factors in latency, detectability, and duty cycle throughout a mission profile. However, the established reliability assumes a system or component of the aerial vehicle is new with no regard to degradation over time. Reliability Centered Maintenance (RCM) and Condition Based Maintenance Plus (CBM+) can be used to improve the life cycle of platforms; however, these approaches are limited to individual systems, and do not allow for complete vehicle reliability evaluation. Systems are becoming more complex with the incorporation of integrated vehicle health management (IVHM) constructs to provide real time diagnostics and prognostics in an effort to improve operational availability. Such technologies provide opportunities for deriving real time and meaningful health of the system during the entire life cycle through a dynamic reliability construct. Dynamic reliability can be utilized in modeling factors using conditional probability based on the remaining useful life of equipment, degradation of redundant system paths, and the ability of the equipment to complete a specified mission. There are opportunities to account for the reliability growth of the platform and leverage Failure Reporting and Corrective Action System (FRACAS) to influence mission modeling.

According to the system and methods described herein dynamic modeling of reliability at varying system levels can be achieved to provide a user real time information on which assets to deploy for critical missions and the ability to influence maintenance periodicity. Reliability impacts relative to a loss of redundancy during a mission can influence dynamic reliability modeling and provide the end user with a real time probability of mission success based on mission parameters. By adopting a dynamic reliability modeling approach, aspects of a platform (e.g., an aerial vehicle) can be more accurately modeled to represent real time conditions to provide higher confidence in vehicle reliability, safety risks, and mission success. The system and methods disclosed herein leverage machine learning algorithms based on historical mission events, equipment usage, and/or maintenance effectives for more intelligent mission and maintenance planning.

In some examples, a mission planning and maintenance system can be configured to utilize dynamic reliability models to characterize reliability behaviors of systems and components of the aerial vehicle and provide for a more accurate computation probability performance. The dynamic reliability models coupled with machine learning algorithms can be employed to influence mission planning, maintenance, and in some instances fleet optimization, as disclosed herein. Developed mission models originating from pre-defined models such as FTA or RBD specific to a given mission can be updated in real-time utilizing conditional item-specific probability models unique to each system/equipment derived from the machine learning algorithm to construct a dynamic probabilistic model. In some examples, conditional probability can be determined by flight hours accumulated in the aerial vehicle and a mission exposure time can be employed to influence a probability of success at a system and/or component to a fleet level. In some examples, flight hours can be derived from maintenance records or other methods from the platform. The mission planning and maintenance system can use best fit probability computation methods (exponential, Weibull, Markov, etc.) for computing system and component reliability.

Because the mission planning and maintenance system disclosed herein can use dynamic reliability models with conditional probabilities, the dynamic reliability models can be updated based on real-time equipment state information provided by system diagnostic capabilities. In some examples, the dynamic reliability models can be used to provide a probability of mission success. As such the mission planning and maintenance system can influence which standby platforms (e.g., aerial vehicles) should be utilized in implementing missions. In some examples, the mission planning and maintenance system can utilize equipment fault reporting and IVHM data to influence the dynamic reliability models in real time. Accordingly, the mission planning and maintenance system can be used to provide a user with real time probability of mission success in a machine learning construct.

In addition to computing probability of mission success for real time mission planning, in some examples, the mission planning and maintenance system can be used to influence aerial vehicle selection by providing real time mission drivers and influence maintenance decisions to improve mission reliability. By providing a paradigm shift from static reliability methods to ascertain reliability drivers, the user has the ability to leverage dynamic computations to ascertain maintenance planning, down time, and accurate sparing models. By implementing the mission planning and maintenance system across a fleet of aerial vehicles as disclosed herein, more accurate mission planning can be leveraged to ensure a high probability of mission success can be obtained for critical missions. The mission planning and maintenance system disclosed herein can be used to influence asset utilization based on real-time data driven reliability modeling. Accordingly, by leveraging dynamic reliability models coupled with machine learning algorithms, the mission planning, and maintenance system herein can ascertain user parameters, environment, and historical events to provide confidence in the mission capability based on asset selection or influence maintenance to bring mission requirements to an acceptable level.

While examples are presented herein for mission and maintenance planning in context of an aerial vehicle, in other examples, the system and methods disclosed herein can be used for mission and maintenance planning of surface vehicles and subsurface vehicles (e.g., submarines). In some examples, the system and methods disclosed herein can be used to influence a sequencing of individual components within a swarm construct to ensure mission success. In other examples, the system and methods disclosed herein can be used in manufacturing to identify equipment risks prior to time-sensitive manufacturing. Manufactures can employ the systems and methods disclosed herein to improve the utilization of production assets. Products that are created using machines that have an extended production cycle can benefit from the systems and methods disclosed herein by allowing for a machine to be selected that is least likely to fail during the production of that product. Additionally, if multiple production lines are used to create products, the production line that is most likely to succeed can be identified according to the system and methods disclosed herein and prioritized over less reliable equipment.

FIG. 1 is an example of a mission planning and maintenance system 100. The mission planning and maintenance system 100 can be implemented on a computer, such as a laptop computer, a desktop computer, a tablet computer, a server, a workstation, or the like. In some examples, the mission planning and maintenance system can be implemented in a cloud computing environment. The mission planning and maintenance system 100 can be configured to identify vehicle drivers, and compute a probability for each aerial vehicle indicative of mission success (e.g., a likelihood that an aerial vehicle can complete a mission). The term "vehicle driver" as used herein can refer to an event and/or a condition that can impact a probability of aerial vehicle mission success. The vehicle drivers can include mission drivers and maintenance drivers. The mission drivers can identify one or more components (e.g., an antenna) and/or systems (e.g., communication system) of at least one aerial vehicle that have a greatest impact on aerial vehicle mission success. Thus, the mission drivers can identify components and/or systems of the at least one aerial vehicle that are most critical to the user selected mission being completed successfully. The maintenance drivers can identify the one or more components or systems of at least one aerial vehicle that may require maintenance (e.g., repair, replacement, upgrading, and the like).

In some examples, the mission planning and maintenance system 100 includes a reliability calculator 102 that can be configured to compute a vehicle reliability value indicative of an availability of an aerial vehicle. The indication of availability for each aerial vehicle can correspond to an indication of a failure or a success rate of the aerial vehicle. For example, the reliability calculator 102 can include a dynamic reliability model 104 for each aerial vehicle. In some examples, each dynamic reliability model 104 can identify a logical and/or functional connection between nodes (e.g., systems and components) of the aerial vehicle. Each node of each of dynamic reliability model 104 of the aerial vehicle can represent a vehicle element (e.g., a system or component) of the aerial vehicle and can have or be associated with a node reliability value that can collectively be indicative of an overall reliability of the aerial vehicle. The node reliability value for each element can be indicative of a failure or a success rate of the vehicle element. In some examples, the reliability calculator 102 can be configured to compute the node reliability value for the vehicle element within the dynamic reliability model 104. In some examples, at least some of the nodes of at least one dynamic reliability model 104 for the at least one aerial vehicle can be updated as disclosed herein (e.g., based on biases and item-specific reliability derived from a machine learning schema) to thereby influence the vehicle reliability value for the at least one aerial vehicle.

In some examples, the mission planning and maintenance system 100 includes a model adjustment engine 106 for updating and biasing the dynamic reliability model 104. The model adjustment engine 106 can be configured to update the dynamic reliability model 104 for each aerial vehicle, such that a more accurate (overall) vehicle reliability value can be computed for each aerial vehicle. For example, the model adjustment engine 106 can be configured to update the dynamic reliability model 104 based on component reliability data 108. The component reliability data 108 can include a component reliability value indicative of a reliability of a respective component of a respective aerial vehicle following one or more missions or flights by the respective aerial vehicle. The model adjustment engine 106 can be configured to update a node reliability value for the respective component of the dynamic reliability model 104 to the component reliability value to provide an updated node reliability value. Thus, the model adjustment engine 106 can be programmed to influence the vehicle reliability value computed for the respective vehicle by the reliability calculator 102. In some examples, the model adjustment engine 106 can influence the vehicle reliability computed by the reliability calculator 102 based on factor biasing data 110. The factor biasing data 110 can include a factor biasing value indicative of an influence that external factors had on the respective component during the one or more missions or flights by the respective aerial vehicle. The model adjustment engine 106 can be configured to update the node reliability value for the respective component of the dynamic reliability model 104 for the respective aerial vehicle based on the factor biasing value.

In some examples, the mission planning and maintenance system 100 includes a component reliability and biasing library 112. The component reliability and biasing library 112 can include machine learning algorithms that can be trained to provide one of the component reliability data 108 and the factor biasing data 110. For example, a first machine learning algorithm of the component reliability and biasing library 112 can be trained to predict a reliability of the respective component of the aerial vehicle based on component data characterizing a current age of the respective component, historical failures of the respective component (e.g., how the component failed in the past), and observed survivors for the respective component. A second machine learning algorithm of the component reliability and biasing library 112 can be trained to predict an influence that one or more external factors have on the respective component based on external factor data characterizing an environment in which the respective component was used, such as weather conditions experienced by the respective aerial vehicle during one or more (previously) executed missions or flights.

In some examples, the mission planning and maintenance system 100 includes a mission engine 114. The mission engine 114 can be configured to evaluate each computed vehicle reliability value for each aerial vehicle by the reliability calculator 102 for mission selection. For example, the mission engine 114 can be configured to identify the respective aerial vehicle (e.g., from a fleet of aerial vehicles) for implementing the mission based on the vehicle reliability value for each aerial vehicle. In some examples, the mission engine 114 can be configured to identify the respective aerial vehicle for the mission in response to determining that the vehicle reliability value for the respective aerial vehicle is greater than vehicle reliability values for other aerial vehicles of the fleet of aerial vehicles.

In some examples, the mission engine 114 can be configured to identify the respective aerial vehicle for the mission based on mission control data 116. For example, the mission engine 114 can be configured to generate a mission model 118 for each aerial vehicle. The mission model 118 can be representative of mission success for the respective aerial vehicle and can include one or more mission model parameters. The one or mission model parameters for each aerial vehicle can be updated by the mission engine 114 based on computed vehicle reliability value for the respective aerial vehicle. By way of example, the one or more mission model parameters can include a reliability parameter and a mission duration parameter. In other examples, the one or more mission model parameters can include additional or other types of parameters. The mission control data 116 can characterize a duration of the mission (e.g., a mission exposure time or at-risk period), a level of acceptable vehicle reliability for the mission, and/or a mission stress factor threshold indicative of a type of mission. Mission duration or mission exposure time can be used by the mission engine 114 to compute a conditional probability corresponding to the mission model 118. Thus, the mission duration or the mission exposure time can be used by the mission engine 114 to update the mission model 118 to provide a more accurate representation of mission success.

The mission control data 116 can be generated by a user, such as at an input device. In some examples, the mission engine 114 can be configured to identify the respective aerial vehicle for the mission based on the mission stress factor threshold of the mission control data 116. For example, if the mission is identified by the mission control data 116 is non-critical (e.g., a flight training mission), to minimize wear and extend a life cycle of systems and/or components of aerial vehicles for critical missions (e.g., a reconnaissance mission), the mission engine 114 can be configured to identify the respective aerial vehicle of the aerial vehicles for the mission. The respective aerial vehicle of the aerial vehicles can have a vehicle reliability value that is greater than or equal to the mission stress factor threshold. In some examples, the respective aerial vehicle can be identified in response to having a vehicle reliability value that is less than the mission stress factor threshold. In other examples, the respective aerial vehicle for implementing the mission can be identified by evaluating a mission of success probability for each aerial vehicle (e.g., provided based on the mission model 118) relative to the mission stress factor threshold of the mission control data to identify the respective aerial vehicle.

In some examples, the mission engine 114 can be configured to identify the respective aerial vehicle for the mission based on the level of acceptable vehicle reliability. The level of acceptable vehicle reliability for the mission can correspond to a vehicle selection threshold. The mission engine 114 can be configured to compare each vehicle reliability value for each aerial vehicle to the vehicle selection threshold and identify the respective aerial vehicle based on the comparison. For example, the respective aerial vehicle can be identified for the mission in response to determining that the vehicle reliability value for the respective aerial vehicle is greater than or equal to the vehicle selection threshold.

In some examples, the mission control data 116 can identify a system or component that may be critical to a success of the mission. For example, if the mission is a reconnaissance mission, the mission control data 116 may indicate that a radar system for obtaining images with a given spatial resolution is to be used for the mission, and in this example, a subset of aerial vehicles of the fleet of aerial vehicles are configured with a radar system that meets the given spatial resolution requirement. The mission engine 114 can be configured to analyze each dynamic reliability model 104 for each aerial vehicle to identify a subset of dynamic reliability models for the subset of aerial vehicles of the aerial vehicles that include the system or component that is deemed critical to the success of the mission. Accordingly, the mission engine 114 can be configured to identify the subset of aerial vehicles that include the system or component that is deemed critical to the success of the mission.

In some examples, the mission engine 114 can be configured to evaluate each mission model 118 for each aerial vehicle compute a mission of success probability for each aerial vehicle. The mission of success probability can correspond to a value indicative of a likelihood that the respective aerial vehicle can successfully complete the mission. For example, the mission engine 114 can be configured to update the reliability parameter for a respective mission model 118 for the respective aerial vehicle to provide an updated mission model 118 based on a vehicle reliability value for the respective aerial vehicle provided by the reliability calculator 102. The mission engine 114 can be configured to compute the mission of success probability for the respective aerial vehicle (or each identified aerial vehicle) for the mission in response to evaluating the updated mission model 118. The mission engine 114 can be configured to generate output data 120. The output data 120 can include the mission of success probability and information identifying each aerial vehicle for implementing the mission. In some examples, the output data 120 can be rendered on an output device (e.g., a display) to notify the user (e.g., a mission commander) as to the likelihood of each aerial vehicle successfully completing the mission.

In some examples, the mission engine 114 can be configured to determine the mission drivers based on the dynamic reliability model 104 for each aerial vehicle. As disclosed herein, the mission drivers can identify one or more components and/or systems of the at least one aerial vehicle that have a greatest impact on aerial vehicle mission success. For example, the mission engine 114 can be configured to evaluate the dynamic reliability models 104 to identify respective nodes of corresponding dynamic reliability models 104 that have a greatest influence on the computation of the vehicle reliability value for respective aerial vehicles. Each node in each dynamic reliability model 104 can be representative of a system or a component of the respective aerial vehicle. The mission engine 114 can be configured to generate the output data 120 with each identified node corresponding to the system or component of the respective aerial vehicle identified therein having the greatest influence on the computation of the vehicle reliability value for the respective aerial vehicles. Accordingly, each mission driver for the respective aerial vehicle having the greatest impact on the probability of the respective aerial vehicle successfully completing the mission can be identified (e.g., in the output data 120).

In some examples, the mission engine 114 can be configured to determine the maintenance drivers based on the dynamic reliability models 104 for each aerial vehicle. For example, the mission engine 114 can be configured to evaluate the dynamic reliability models 104 to identify respective nodes representative of systems and/or components that have a node reliability value that is less than or equal to a maintenance threshold. The respective nodes that have a corresponding node reliability value that is less than or equal to the maintenance threshold can be indicative that the systems and/or components of the respective aerial vehicle that may require maintenance. The mission engine 114 can be configured to generate the output data 120 with each identified node corresponding to the system or component of the respective aerial vehicle that may require maintenance. Accordingly, the mission engine 114 can be configured to identify aerial vehicles that require maintenance corresponding to identifying aerial vehicles with that reduce the probability that respective aerial vehicle can successfully complete the mission.

Accordingly, the mission planning and maintenance system 100 allows for the selection of reliable aerial vehicles for mission implementation and fosters proactive maintenance versus reactive maintenance to increase mission availability. The mission planning and maintenance system 100 could be used to optimize an aerial vehicle fleet and identify the most reliable aerial vehicles for the mission. Moreover, the mission planning and maintenance system 100 enables the user to identify an aerial vehicle having a reduced probability of completing a flight and perform maintenance to increase the likelihood of mission success. Thus, the user can identify which aerial vehicles are most reliable and which systems and/or components would be the most likely cause of mission failure in real time.

Figure 2:
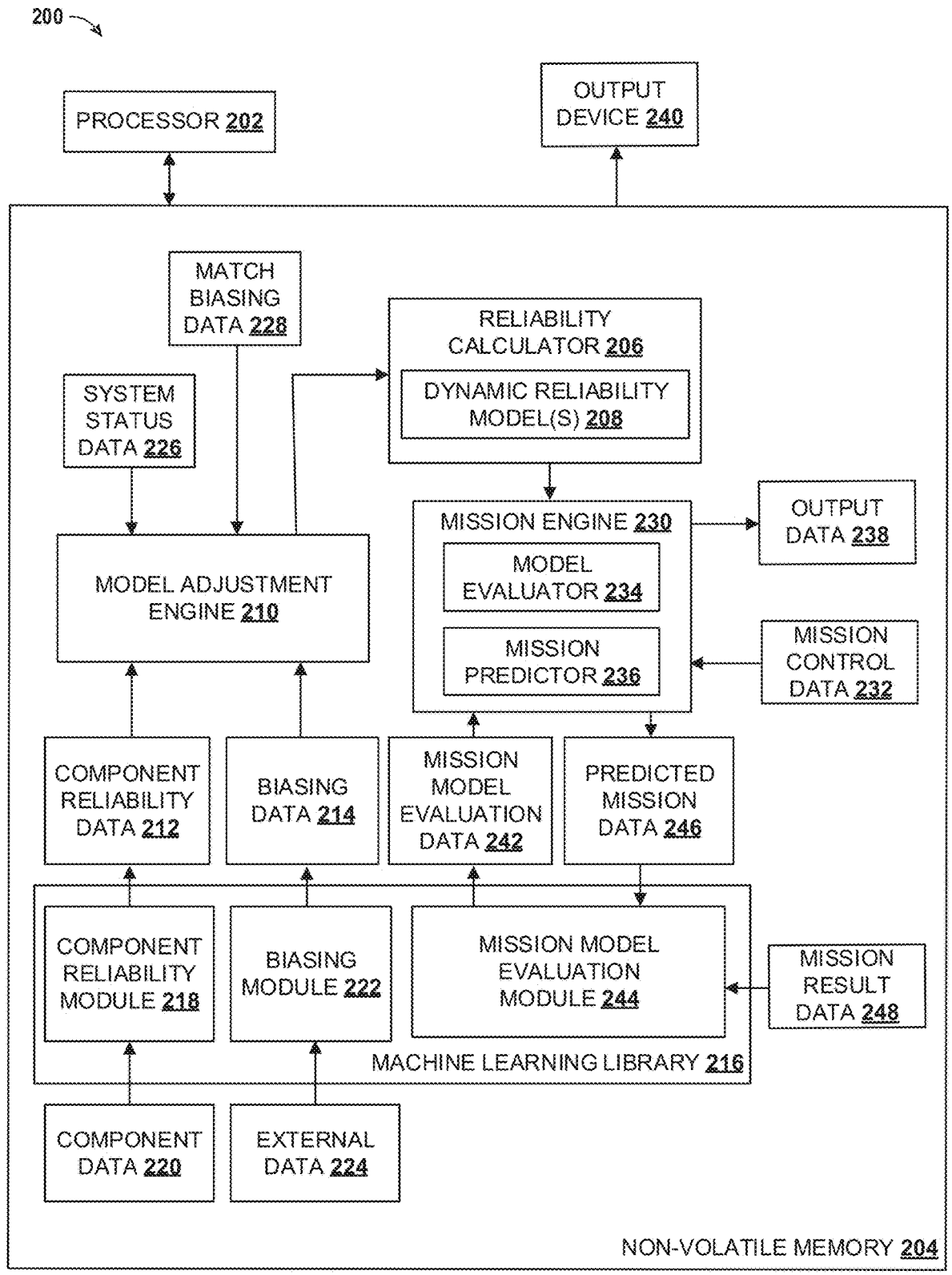
FIG. 2 is an example of another mission planning and maintenance system.

FIG. 2 is an example of a mission planning and maintenance system 200. The mission planning and maintenance system 200 can be configured to identify vehicle drivers for a mission. The mission planning and maintenance system 200 can be configured to compute a mission of success probability indicative of a likelihood that a respective aerial vehicle can complete the mission successfully based on an indication of reliability of the respective aerial vehicle. The mission planning and maintenance system 200 can be used to influence mission planning, maintenance of vehicles, and allow for aerial vehicles to be identified that provide a greatest probability mission success. The mission drivers can identify one or more components (e.g., an antenna) and/or systems (e.g., communication system) of at least one aerial vehicle that have a greatest impact on aerial vehicle mission success. Thus, the mission drivers can identify components and/or systems of the at least one aerial vehicle that are most critical to the mission being completed by the at least aerial vehicle successfully. The maintenance drivers can identify the one or more components or systems of at least one aerial vehicle that may require maintenance (e.g., repair, replacement, upgrading, and the like).

In some examples, the mission planning and maintenance system 200 can be configured to generate a probability of model confidence based on a reinforcement value of a platform level model compared to historical model performance. For example, the mission planning and maintenance system 200 can be configured to provide a probability value indicative of how accurate a mission model for an aerial vehicle is based on historical model data. The historical model data can identify one or more previous mission models generate for the aerial vehicle or other aerial vehicles and an accuracy of the one or more previous mission models to predict mission success.

The mission planning and maintenance system 200 can be implemented on a computer, such as a laptop computer, a desktop computer, a tablet computer, a server, a workstation, or the like. In other examples, the mission planning and maintenance system 200 can be implemented in a cloud computing environment. In some examples, the mission planning and maintenance system 200 includes a processor 202 and memory 204. The memory 204 can be implemented, for example, as a non-transitory computer storage medium, such as volatile memory (e.g., random access memory), non-volatile memory (e.g., a hard disk drive, a solid-state drive, flash memory, or the like), or a combination thereof. The processor 202 can be configured to access the memory 204 and execute the machine-readable instructions stored in the memory 204 to identify the mission drivers for the mission, one or more aerial vehicles for implementing the mission, and the probability of each aerial vehicle successfully completing the mission. In the present example of FIG. 2, although the components of the mission planning and maintenance system 200 are illustrated as being implemented on the same system, in other examples, the different components could be distributed across different systems (e.g., computers, devices, etc.) and communicate, for example, over a network (e.g., a wireless and/or wired network).

In some examples, the memory 204 includes a reliability calculator 206. The reliability calculator 206 can be similar to the reliability calculator 102, as shown in FIG. 1. The reliability calculator 206 can be programmed to compute a vehicle reliability value. The vehicle reliability value can be indicative of an availability of an aerial vehicle. The indication of availability for each aerial vehicle can correspond to an indication of a failure or a success rate of the aerial vehicle. The reliability calculator 206 can include a dynamic reliability model 208 for each aerial vehicle that can provide a different level of abstractness of the aerial vehicle. In some examples, the dynamic reliability model 208 can include one or more predefined models (e.g., constructed at a reliability modeling stage), such as RBDs, FTAs, functional models, or a combination thereof that can be updated as disclosed herein to provide for dynamic reliability modeling. In other examples, different types of predefined models can be used. Thus, the dynamic reliability model 208 for each aerial vehicle can include a number of hierarchical levels representing systems and components of the aerial vehicle at respective levels of abstractness. As such, each dynamic reliability model 208 for each aerial vehicle can process a point of failure and redundancies in systems and components.

In some examples, each dynamic reliability model 208 can identify a logical and/or functional connection between nodes (e.g., systems and components) of the aerial vehicle. Each node of each of the dynamic reliability model 208 of aerial vehicle can represent a vehicle element (e.g., a system or component) of the aerial vehicle and can have or be associated with a node reliability value. The reliability calculator 206 can be configured to compute an indication of vehicle reliability for the respective aerial vehicle based on node reliability values of the dynamic reliability model for the respective aerial vehicle. As disclosed herein, at least some of the nodes of at least one dynamic reliability model 208 for the at least aerial vehicle can be influenced as described herein (e.g., based on biases and item-specific reliability derived from a machine learning schema) to thereby influence a computation of vehicle reliability for the at least one aerial vehicle.

In some examples, the memory 204 can include a model adjustment engine 210. The model adjustment engine 210 can be similar to the model adjustment engine 106, as shown in FIG. 1. The model adjustment engine 210 can be programmed to influence the dynamic reliability model 208 for each aerial vehicle, such that a more accurate vehicle reliability can be computed for each aerial vehicle. For example, the model adjustment engine 210 can be programmed to influence the dynamic reliability model 208 based on component reliability data 212. The component reliability data 212 can be similar to the component reliability data 108, as shown in FIG. 1. The component reliability data 212 can include a component reliability value indicative of a reliability of a respective component of a respective aerial vehicle following one or more missions or flights by the respective aerial vehicle. The model adjustment engine 210 can be programmed to update a node reliability value for the respective component of the dynamic reliability model 208 to the component reliability value to provide an updated node reliability value. Thus, the model adjustment engine 210 can be programmed to influence the vehicle reliability value computed for the respective vehicle by the reliability calculator 102.

In some examples, the model adjustment engine 210 can influence the vehicle reliability computed by the reliability calculator 206 based on biasing data 214. The biasing data 214 can be similar to the factor biasing data 110, as shown in FIG. 1. The biasing data 214 can include a factor biasing value indicative of an influence that external factors had on the respective component during the one or more missions or flights by the respective aerial vehicle. The model adjustment engine 210 can be programmed to update the node reliability value for the respective component of the dynamic reliability model 104 for the respective aerial vehicle based on the factor biasing value. For example, the model adjustment engine 210 can be programmed to multiply the node reliability value (or in some examples the updated node reliability value) by the factor biasing value to provide a biased factor value for the respective component. Because the node reliability value for the respective component can be updated based on the factor biasing value the effect of external factors on the respective component of the respective aerial vehicle can be considered (e.g., incorporated) into the dynamic reliability model 208 for the respective aerial vehicle to improve an overall reliability modeling for the respective aerial vehicle.

In some examples, the memory includes a machine learning library 216. The machine learning library 216 can be similar to the component reliability and biasing library 112, as shown in FIG. 1. The machine learning library 216 can include a component reliability module 218. The component reliability module 218 can correspond to a first machine learning algorithm programmed to predict a reliability of the respective component of the aerial vehicle. By way of example, the first machine learning algorithm can be a supervised machine learning algorithm that can be one of a linear regression algorithm, a Naïve Bayes classifier algorithm, a Random Forest algorithm, a Deep Weibull Recurrent Neural Network (RNN), a decision tree algorithm, or a support vector machine (SVM). In other examples, a different type of supervised machine learning algorithm can be used to provide the component reliability module 218. The component reliability module 218 can be programmed to generate the component reliability data 212 based on component data 220. In some examples, at least some of the component data 220 can be provided by a FRACAS system. The component data 220 can characterize a current age of the respective component, historical failures of the respective component (e.g., inherent component failures in the past), and observed survivors for the respective component (e.g., components that have not yet experienced a failure). Accordingly, the component reliability module 218 can be programmed to predict the reliability of the respective component, which as disclosed herein can be used by the model adjustment engine 210 to influence the dynamic reliability model 208 for the respective aerial vehicle.

In some examples, the machine learning library 216 can include a biasing module 222. The biasing module 222 can correspond to a second machine learning algorithm that can be programmed to predict an influence that one or more external factors have on the respective component during the one or more (previously) executed missions or flights. In some examples, the second machine learning algorithm can be programmed to further predict an influence that a system of the aerial vehicle has on the respective component. For example, the system can include the respective component, and as a health of the system degrades over time, the degradation of the system can impact a performance of the respective component. By way of example, the second machine learning algorithm can be an unsupervised machine learning algorithm that can be a clustering algorithm, such as a hierarchical clustering algorithm, a K-means clustering algorithm, or a principal component analysis algorithm. In other examples, a different type of unsupervised machine learning algorithm can be used to provide the biasing module 222.

The biasing module 222 can be programmed to generate the biasing data 214 based on external data 224. The external data 224 can characterize an environment in which the respective component was used, such as weather conditions (e.g., temperature, humidity, precipitation, and the like) experienced by the aerial vehicle or other aerial vehicles during one or more (previously) executed missions or flights. In some examples, the external data 224 can include vehicle location information indicative of operating locations of the aerial vehicle or the other aerial vehicles. The biasing module 222 can be programmed to evaluate the vehicle location information to determine that a respective operating location influences a reliability of the respective component to provide the biasing data 214. Varying operation locations could have varying temperature and/or humidity environments and possible varying location dependent maintenance personnel maintaining the vehicle.

In some examples, the external data 224 can characterize a behavior of the system that includes the respective component during the one or more executed missions or flights. For example, the FRACAS system can be employed to perform a root cause and corrective action. This allows the biasing module 222 to understand what conditions lead up to the suspect failure. For example, the external data 224 can enable the biasing module 222 to understand if there was a certain fault signature (or combination of faults) in a corresponding system that lead to component failure. In some examples, the external data 224 can characterize a circumstance that leads up to the failure of the respective component, such as mission type, location, etc. The biasing module 224 can be programmed to determine the degree of influence that factors have on the reliability of the respective component based on the external data 224. Thus, in some examples, the biasing module 224 can be programmed to provide the biasing data 214 characterizing the degree of influence that the factors have on the reliability of the respective component. Accordingly, the biasing module 222 can be programmed to determine the influence that the external factors had on the respective component, which as disclosed herein, can be used by the model adjustment engine 210 to influence the dynamic reliability model 208 for the respective aerial vehicle.

In some examples, the model adjustment engine 210 can be programmed to influence the dynamic reliability model 208 for the respective aerial vehicle based on system status data 226. The system status data 226 can identify which systems of the respective aerial vehicle are in an active state (e.g., an operational state), a failed state (e.g., a non-operational state), and/or degraded state (e.g., a partially operational state). In some examples, the system status data 226 can identify fault signatures and onboard sensor values. In some examples, at least some of the system status data 226 is provided by an onboard diagnostic system or a health management system on the aerial vehicle. In some examples, the system status data can include CBM+ data that can be generated based on sensor output or a combination of sensor outputs. In some examples, the system status data 226 can include equipment state, such as current faults, sensor data, and equipment health parameters. The model adjustment engine 210 can be programmed to update the dynamic reliability model 208 for the respective aerial vehicle based on the system status data 226. The model adjustment engine 210 can be programmed to update a respective node reliability value for a respective system of the respective aerial vehicle based on the system status data 226. For example, if a redundant system of the respective aerial vehicle is in the failed state, as indicated by the system status data 226, the model adjustment engine 210 can be programmed to update the respective node reliability value for the redundant system of the dynamic reliability model 208 to an updated respective node value (e.g., zero) indicative that the redundant system is not operational. Accordingly, the model adjustment engine 210 can be programmed to influence the dynamic reliability model 208 for the respective aerial vehicle based on current system states of the aerial vehicle.

In some examples, the model adjustment engine 210 can be programmed to influence the dynamic reliability model 208 for the respective aerial vehicle based on match biasing data 228. In some examples, the match biasing data 228 can be used by the model adjustment engine 210 to drive the influence of the dynamic reliability model 208 for the respective aerial vehicle. For example, the model adjustment engine 210 can employ the match biasing data 210 to process the biasing data 214 to update the dynamic reliability model 208 for the respective aerial vehicle. The match biasing 210 can identify or specify which biasing information from the biasing data 214 to use for updating the dynamic reliability 208.

In some examples, the memory can include a mission engine 230. The mission engine 230 can be similar to the mission engine 114, as shown in FIG. 1. The mission engine 230 can be programmed to evaluate each computed vehicle reliability value for each aerial vehicle by the reliability calculator 206 for mission selection. For example, the mission engine 230 can be programmed to identify the respective aerial vehicle (e.g., from a fleet of aerial vehicles) for implementing the mission based on the vehicle reliability value for each aerial vehicle. The mission engine 230 can be programmed to compare each vehicle reliability value for each aerial vehicle to a vehicle selection threshold and identify the respective aerial vehicle based on the comparison. In some examples, the mission engine 230 can be programmed to identify the respective aerial vehicle for the mission in response to determining that the vehicle reliability value for the respective aerial vehicle is greater than vehicle reliability values for other aerial vehicles of the fleet of aerial vehicles.

In some examples, the mission engine 230 can be programmed to identify the respective aerial vehicle based on mission control data 232. The mission control data 232 can characterize a duration of the mission, a level of acceptable vehicle reliability for the mission, and/or a mission stress factor indicative of a type of mission. In some examples, the mission control data 232 can be provided to the model adjustment engine 210 to influence the dynamic reliability model 208 for the respective aerial vehicle. For example, if the dynamic reliability model 208 includes a conditional probability, to calculate the vehicle reliability value for the respective vehicle, the reliability calculator 206 can employ the duration of the mission as identified by the mission control data 232. In some examples, the mission control data 232 can include the vehicle selection threshold, and thus can be used by the mission engine 230 to identify the respective aerial vehicle for the mission.

In some examples, the mission engine 230 can be programmed to identify the respective aerial vehicle based on the mission stress factor of the mission control data 232. For example, if the mission is deemed non-critical (e.g., a flight training mission) by the mission control data 232, to minimize wear and extend a life cycle of aerial vehicles for critical missions (e.g., a reconnaissance mission), the mission engine 230 can be programmed to identify the respective aerial vehicle of the aerial vehicles having a vehicle reliability value is within a vehicle reliability range. The vehicle reliability range can be defined by the mission control data 232.

In some examples, the mission engine 230 can include a model evaluator 234 that can be programmed to evaluate each reliability model 208 for each aerial vehicle to identify the respective aerial vehicle for the mission based on the mission control data 232. In some examples, the mission control data 232 can identify a system or component that may be critical to mission success. For example, if the mission is a reconnaissance mission, the mission control data 232 may indicate that a radar system for obtaining images with a given spatial resolution is to be used for the mission, and a subset of aerial vehicles of the fleet of aerial vehicles are configured with a radar system that meets the given spatial resolution requirement.

The model evaluator 234 can be programmed to analyze each dynamic reliability model 208 for each aerial vehicle to identify a subset of dynamic reliability models for the subset of aerial vehicles of the aerial vehicles that include the system or component that is deemed critical to the success of the mission. For example, the model evaluator 234 can be programmed to evaluate node reliability values of the dynamic reliability models 208 to identify the subset of dynamic reliability models for the subset of aerial vehicles of the aerial vehicles that include the system or component that is deemed critical to the success of the mission. Each node reliability value of the dynamic reliability models 208 for the aerial vehicles can be compared to a corresponding threshold to identify nodes and thus the subset of dynamic reliability models that are greater than or equal to the corresponding threshold. Accordingly, the model evaluator 234 can be programmed to identify dynamic reliability models and thus corresponding aerial vehicles that include the system or component that is deemed critical to the success of the mission by the mission control data 232.

In some examples, the model evaluator 234 can be programmed to evaluate each vehicle reliability value provided by the subset of dynamic reliability models for the subset of aerial vehicles of the aerial vehicles to identify a greatest vehicle reliability value. The greatest vehicle reliability provided by a respective dynamic reliability model can be indicative of the respective aerial vehicle. In some examples, the model evaluator 234 can be programmed to compare each vehicle reliability value provided by the subset of dynamic reliability models for the subset of aerial vehicles of the aerial vehicles to the vehicle selection threshold. Each vehicle reliability value that is greater than or equal to the vehicle selection threshold can be further evaluated to identify the greatest vehicle reliability value that can be indicative of the respective aerial vehicle for the mission.

In some examples, the mission engine 230 can include a mission predictor 236. The mission predictor 236 can be programmed to compute a mission of success probability for each aerial vehicle (or identified aerial vehicle). In some examples, the mission predictor 236 can be programmed to generate a mission model (e.g., the mission model 118, as shown in FIG. 1) as disclosed herein for computing the mission of success probability. The mission of success probability can correspond to a value indicative of a likelihood that the respective aerial vehicle can successfully complete the mission. Thus, in some examples, the mission of success probability for the respective aerial vehicle can be a function of time and reliability. For example, the mission predictor 236 can be programmed to compute the mission of success probability based on the computed vehicle reliability value for each aerial vehicle. In some examples, if the mission of success probability is less than a mission success threshold, the mission predictor 236 can be programmed to disregard the respective aerial vehicle for the mission and alert a user (e.g., on an output device 240). The mission engine 230 can be programmed to generate output data 238. The output data 238 can include the mission success probability and information identifying each aerial vehicle identified by the mission engine 230 for implementing the mission. In some examples, the output data 238 can be rendered on the output device 240 (e.g., a display) to alert the user (e.g., a mission commander) as to the likelihood of each aerial vehicle successfully completing the mission.

In some examples, the mission engine 230 can be programmed to compute the mission drivers based on the dynamic reliability model 208 for each aerial vehicle. As disclosed herein, the mission drivers can identify the one or more components and/or systems of the at least one aerial vehicle that have a greatest impact on aerial vehicle mission success. For example, the model evaluator 234 can be programmed to evaluate the dynamic reliability models 208 to identify respective nodes (e.g., components and/or systems of the respective aerial vehicle) that have a greatest influence on the computation of the vehicle reliability value. The module evaluator 234 can be programmed to generate the output data 238 with each identified node corresponding to the system or component of the respective aerial vehicle identified therein having the greatest influence on the computation of the vehicle reliability value for the respective aerial vehicles. Accordingly, each mission driver for the respective aerial vehicle having the greatest impact on the probability of the respective aerial vehicle successfully completing the mission can be identified in the output data 238.

In some examples, the mission engine 230 can be programmed to determine the maintenance drivers based on the dynamic reliability model 208 for each aerial vehicle. The maintenance drivers can identify components or systems of the respective aerial vehicle that may require maintenance (e.g., repair, replacement, upgrading, and the like). For example, the model evaluator 234 can be programmed to evaluate the dynamic reliability models 208 to identify respective nodes representative of systems or components that have a node reliability value that is less than or equal to a maintenance threshold. The module evaluator 234 can be programmed to generate the output data 238 with each identified node corresponding to the system or component of the respective aerial vehicle that may require maintenance. Accordingly, the mission engine 114 can be configured to identify aerial vehicles that require maintenance corresponding to identifying aerial vehicles with that reduce the probability that respective aerial vehicle can successfully complete the mission.

In some examples, the mission engine 230 can be programmed to compute a confidence in conclusion, which can be stored as part of the output data 238 in the memory 204. For example, the confidence in conclusion can provide a probability that the mission model is accurately representing the correct platform probability model based on reinforcement constructs, such as states (e.g., component probability, current state, and external factors) and rewards (mission success or failure). Confidence can be computed given inputs of previously positive outcomes, reliability of air vehicles, and mission type and time. Thus, the mission engine 230 can be programmed to compute the confidence in conclusion based on the historical model data.

In some examples, the mission engine 230 can be programmed to update the mission model computed for each aerial vehicle based on mission model evaluation data 242. The machine learning library 216 can employ a mission model evaluation module 244 to generate the mission model evaluation data 242. By way of example, a third machine learning algorithm can be trained for the generation of the mission model evaluation module 244. In some examples, the third machine learning algorithm can be a reinforced machine learning algorithm (e.g., based on Markov Decision Process). The mission engine 230 can be programmed to provide predicted mission data 246. The predicted mission data 246 can characterize the mission of success probability and/or the mission model for each aerial vehicle. The mission model evaluation module 244 can be programmed to generate the mission model data 242 based on the predicted mission data 246 and mission result data 248. The mission result data 248 can be indicative of the mission was successful or whether aborted (e.g., on the ground or in-flight).

Accordingly, the mission planning and maintenance system 200 allows for selection of reliable aerial vehicles for mission implementation and fosters proactive maintenance versus reactive maintenance to increase mission availability. The mission planning and maintenance system 200 could be used to optimize an aerial vehicle fleet and identify the most reliable aerial vehicles for the mission. Moreover, in some instances, aircrafts flying overseas may not be able to perform an emergency landing. Because the mission planning and maintenance system 200 can identify when systems and/or components that require maintenance proactively, an operator (e.g., an aerial vehicle operator, such as an airline, a government agency, and the like) can ensure that systems and/or components that require maintenance are replaced before an oversea mission thus minimizing emergency landings and ensuring flight schedules are kept. Moreover, the mission planning and maintenance system 100 enables the user to identify an aerial vehicle having a reduced probability of completing a flight and perform maintenance to increase the likelihood of mission success. Thus, the user can identify which aerial vehicles are most reliable and which systems and/or components would be the most likely cause of mission failure in real time.

Figure 3:
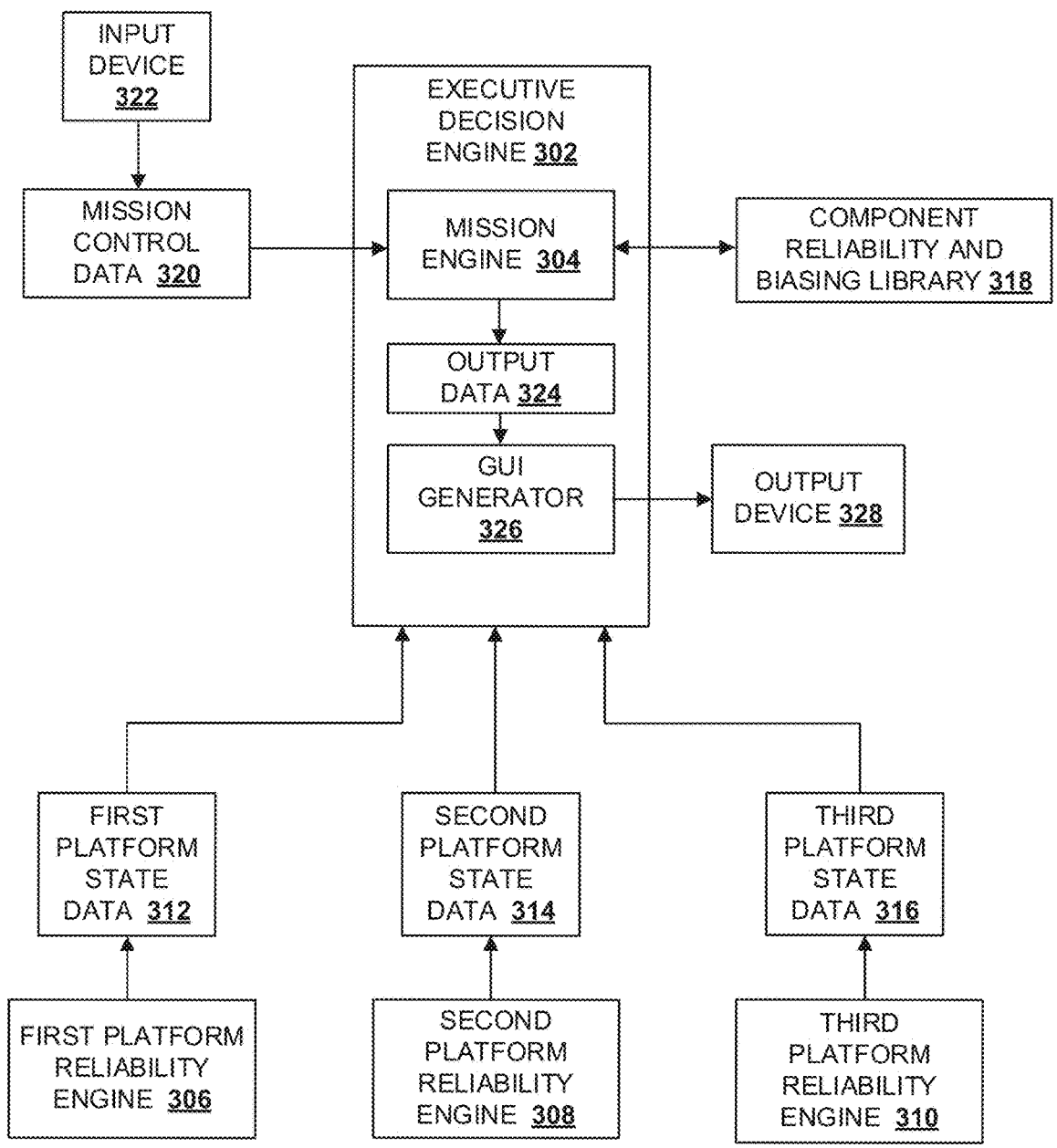
FIG. 3 is an example of an aerial vehicle fleet management system.

FIG. 3 is an example of an aerial vehicle fleet management system 300. The aerial vehicle management system 300 can be implemented on a computer, such as a laptop computer, a desktop computer, a tablet computer, a server, a workstation, or the like. In some examples, the aerial vehicle fleet management system 300 can be implemented in a cloud computing environment. The aerial vehicle management system 300 can be employed to control and thus manage flight planning and maintenance of a fleet of aerial vehicles. For example, the aerial vehicle management system 300 can be configured to identify a subset of aerial vehicles of the fleet of aerial vehicles that provide a greatest probability of successfully completing a mission. In some examples, the aerial vehicle management system 300 can be configured to manage the aerial vehicles by identifying mission drivers that can influence or impact mission success and maintenance drivers that contributed to mission success, as disclosed herein. Accordingly, the aerial vehicle management system 300 can manage a maintenance schedule for the fleet of aerial vehicles by identifying the components or systems of aerial vehicles that may impact the aerial vehicles ability to complete a respective mission successfully.

The aerial vehicle management system 300 can include an executive decision engine 302. The executive decision engine 302 can be configured to identify vehicle drivers and determine a probability of the at least one aerial vehicle successfully completing the mission. In some examples, the executive decision engine 302 can include a mission engine 304. The mission engine 304 can be configured to generate the vehicle drivers and compute a probability of mission success for at least one respective aerial vehicle of the fleet of aerial vehicles. The mission engine 304 can be configured similar to one of the mission engine 114, as shown in FIG. 1, or the mission engine 230, as shown in FIG. 2.

In some examples, the fleet of aerial vehicles includes a first aerial vehicle, a second aerial vehicle, and a third aerial vehicle. In other examples, the fleet of aerial vehicles can include more or less than three aerial vehicles. The aerial vehicle management system 300 includes a first, a second, and a third platform reliability engine 306, 308, and 310 for a respective one of the first, second, and third aerial vehicles. While the example of FIG. 3 illustrates three platform reliability engines, in other examples, more or less than three platform reliability engines can be employed based on a number of aerial vehicles of the fleet of aerial vehicles. Each of the first, second, and third platform reliability engines 306, 308, and 310 can be configured to provide respective first, second, and third platform state data 312, 314, and 316. Each of the first, second and third platform state data 312, 314, and 316 can include a computed vehicle reliability value indicative of a reliability of a respective aerial vehicle of the fleet of aerial vehicles.

Each of the first, second, and third platform reliability engines 312, 314, and 316 can include a model adjustment engine and a reliability calculator that can be configured in a same or similar manner as the model adjustment engine 210 and the reliability calculator 206, as shown in FIG. 2. Thus, the model adjustment engine 210 of each of the first, second, and third platform reliability engines 312, 314, 316 can be configured to update a respective dynamic reliability model for a respective aerial vehicle. As disclosed herein, the model adjustment engine 210 can be configured to modify the respective reliability model based on the component reliability data 212 and the biasing data 214, as shown in FIG. 2. In some examples, the component reliability and biasing data 212 and 214 can be provided by a component reliability and biasing library 318. In some examples, the component reliability and biasing library 318 can correspond to the machine learning library 216, as shown in FIG. 2. As disclosed herein, the reliability calculator of each of the first, second, and third platform reliability engines 312, 314, and 316 can be configured to compute a vehicle reliability value indicative of the reliability of the respective aerial vehicle based on the dynamic reliability model for the respective aerial vehicle. In some examples, the respective platform state data 312, 314, and 316 can include the respective dynamic reliability model and can be provided to the mission engine 304.

The mission engine 304 can be configured to process the respective platform state data 312, 314, and 316 to identify the vehicle drivers and compute the mission probability for each of the aerial vehicles based on corresponding platform state data 312, 314, and 316. In some examples, the mission engine 304 can be configured to identify the at least one aerial vehicle for implementing the mission based on the computed vehicle reliability value for each aerial vehicle, as disclosed herein. In some examples, the mission engine 304 can be configured to identify the at least one aerial vehicle based on mission control data 320. The mission control data 320 can be similar to the mission control data 232, as shown in FIG. 2. Thus, in some examples, the mission engine 304 can be configured to identify the at least one aerial vehicle based on the mission control data 320 in a same or similar manner as disclosed herein with respect to FIG. 2. The mission control data 320 can be provided based on a user input at an input device 322.

In some examples, the mission engine 304 can be configured to compute a mission of success probability for each aerial vehicle corresponding to a value indicative of a likelihood of the respective aerial vehicle successfully completing the mission in a same or similar manner as disclosed herein. For example, the mission engine 304 can be configured to compute the mission success probability for each aerial vehicle based on a respective computed vehicle reliability value for each aerial vehicle. In some examples, the mission engine 304 can be configured to compute the mission drivers for the at least one aerial vehicle based on the respective dynamic reliability model for the at least one aerial vehicle in a same or similar manner as disclosed herein. In additional examples, the mission engine 304 can be configured to compute the maintenance drivers for the at least one aerial vehicle based on the respective dynamic reliability model for the at least one aerial vehicle in a same or similar manner as disclosed herein. In some examples, the mission engine 304 can be configured to update the mission of success probability computed for the at least one aerial vehicle based on mission model evaluation data (e.g., the mission model evaluation data 242, as shown in FIG. 2). The mission biasing data can be generated by the component reliability and biasing library 318. In some examples, the component reliability and biasing library 318 can be configured to receive unobserved events. The component reliability and biasing library 318 can ingest failure modes and subsequent reliability in the model/library of learning that have not been experienced on the platform. This allows the model authority to influence the data accordingly until the data matures. The unobserved events can be provided as part of the component data 220, as shown in FIG. 2.

The mission engine 304 can be configured to generate output data 324. The output data 324 can correspond to the output data 238, as shown in FIG. 2. Thus, the output data 324 can include the computed vehicle reliability value for the at least one aerial vehicle and the vehicle drivers. In some examples, the executive decision engine can include a graphical user interface (GUI) generator 326 that can be configured to receive the output data 324. The GUI generator 326 can be configured to render the output data 324 on an output device 328, which can be similar to the output device 240, as shown in FIG. 2. The output data 324 rendered on the output device 328 can be employed (e.g., by a user) to select or identify a corresponding aerial vehicle with a greatest computed vehicle reliability value for implementing the mission. In some examples, the output data 324 rendered on the output device 240 can be used (e.g., by the user) to identify the component or system of the corresponding aerial vehicle that has a greatest impact on the probability of the aerial vehicle successfully completing the mission. The corresponding aerial vehicle with the component or system that has the greatest impact on mission success can be used for implementing the mission. In some examples, the output data 324 can be used (e.g., by the user) to identify components or systems of the corresponding aerial vehicle that may require maintenance.

Accordingly, the aerial vehicle management system 300 can be configured to identify aerial vehicles for missions that increase a probability of the missions being completed successfully. Thus, the aerial vehicle management system 300 can be used to influence mission planning for an aerial vehicle fleet. Moreover, the aerial vehicle management system 300 can be employed to identify mission drivers that have a greatest impact on mission success. The identified mission drivers can be used to influence mission planning and thus selection of aerial vehicles for implementing the mission. Furthermore, the aerial vehicle management system 300 can influence the maintenance of vehicles by identifying components or systems that have a greatest impact on vehicle reliability to minimize risk or damage to aerial vehicles of the fleet.

Figure 4:
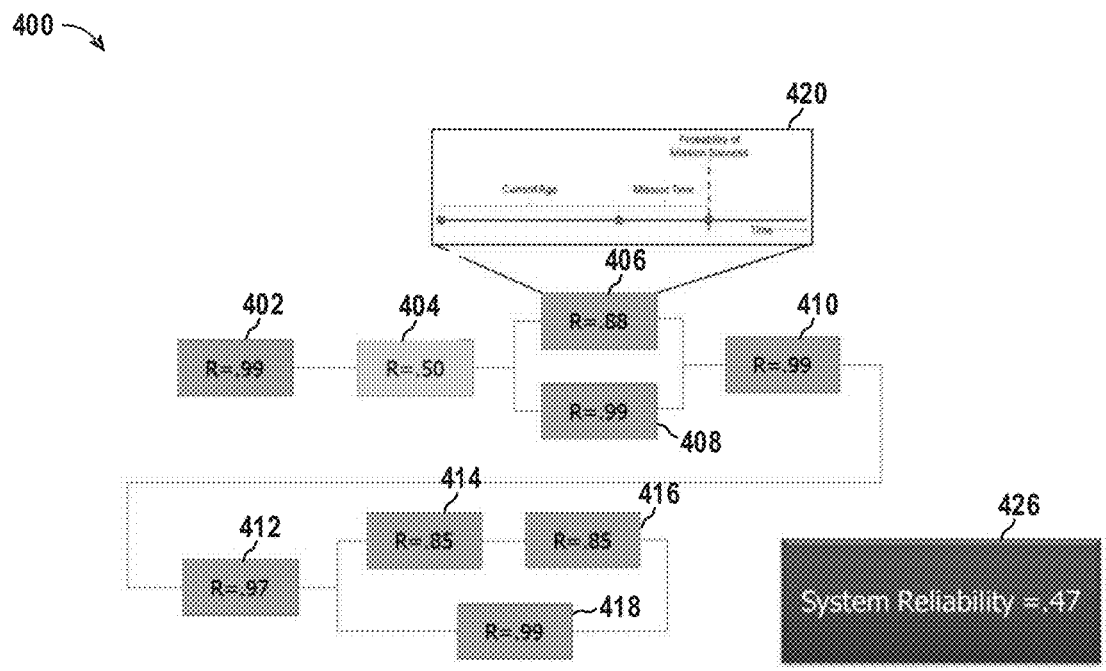
FIG. 4 is an example of a dynamic reliability model.

FIG. 4 is an example of a dynamic reliability model 400. The dynamic reliability model 400 can be generated for a system of an aerial vehicle. By way of example, the dynamic reliability model 400 can be a dynamic RBD model. The dynamic reliability model 400 can model reliability of components of the system. Each component can be represented in the dynamic reliability model 400 as a block diagram 402-418 and in some examples can be referred to as a node. Each node 402-418 can include a node reliability value representing an availability of a respective component of the system. Thus, each node 402-418 can represent an availability (e.g., a success or failure rate) of the respective component of the system. By way of example (referred to herein as the given example), at 406, the node reliability value can be a conditional node reliability value. In the given example, at remaining block diagrams 402-404 and 408-418, respective node reliability values can also be conditional reliability values for respective systems.

In some examples, the dynamic reliability model 400 can be updated via the model adjustment engine 210, as disclosed herein. For example, the model adjustment engine 210 can be configured to update a respective node reliability value of a corresponding block diagram 402-418 based on the component reliability and biasing data 212 and 214 provided by the machine learning library 216, as shown in FIG. 2. By way of example, the model adjustment engine 210 can be configured to update the block diagram 404 to "0.50." In some examples, the dynamic reliability model 400 can be updated following each mission of the aerial vehicle by the model adjustment engine 210 based on the component reliability and biasing data 212 and 214 provided by the machine learning library 216. Thus, the dynamic reliability model 400 can be updated continuously for the aerial vehicle. In some examples, the reliability calculator 206 can be configured to execute the dynamic reliability model 400 to compute a system reliability for the system of the aerial vehicle. The system reliability can be representative of an availability or a probability that the system of the aerial vehicle will not fail during the user-specified mission. In the present example of FIG. 4, the system reliability for the system of the aerial vehicle is 0.47. As disclosed herein, the reliability calculator 206 can be programmed to determine a vehicle reliability indicative of an availability or a probability that the aerial vehicle will not fail during the mission based on the system reliability for each system of the aerial vehicle.

In some examples, the mission engine 230 can be configured to receive the dynamic reliability model 400 and identify one or more components that may require maintenance. For example, the mission engine 230 can be configured to evaluate node reliability values of the nodes 402-418 to determine that the component of the system represented as the node 404 may require maintenance. For example, the mission engine 230 can be configured to compare the node reliability values of the nodes 402-418 to a component reliability threshold to identify each component that is equal to or less than the component reliability threshold. As disclosed herein, the mission engine 230 can be configured to generate a maintenance driver identifying the component of the system represented as the block diagram 404 as requiring maintenance. The maintenance driver can be provided as part of the output data 238, as shown in FIG. 2.

Figure 5:
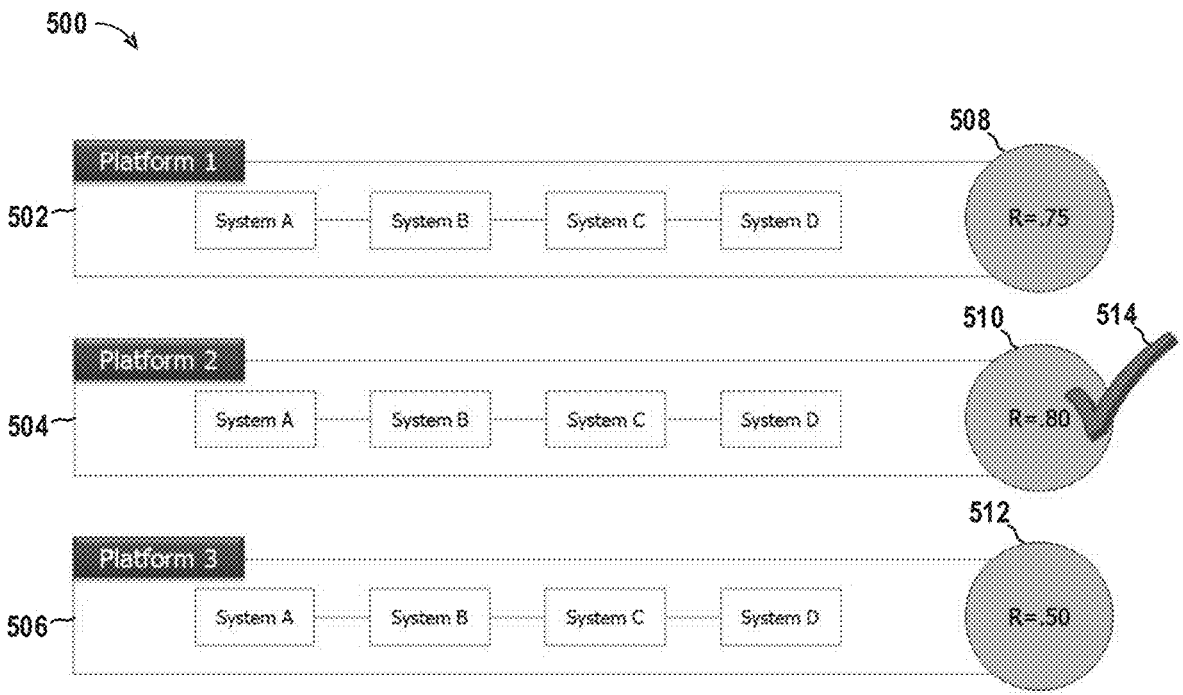
FIG. 5 is an example of a graphical illustration of dynamic reliability models for a fleet of aerial vehicles.

FIG. 5 is an example of a graphical illustration 500 of dynamic reliability models 502-506 for a fleet of aerial vehicles. Each dynamic reliability model 502-506 can correspond to the dynamic reliability model 208 for a respective aerial vehicle of the aerial vehicles, as shown in FIG. 2. Therefore, in some examples, reference can be made to the example of FIGS. 1-4 in the following description of the example of FIG. 5. In the example of FIG. 5, each aerial vehicle of the fleet of aerial vehicles is referred to as a "Platform X," wherein X is an aerial vehicle number. Thus, in some examples, the fleet of aerial vehicles include a first aerial vehicle 502 (labeled as "Platform 1" in FIG. 5), a second aerial vehicle 504 (labeled as "Platform 2" in FIG. 5), and a third aerial vehicle 506 (labeled as "Platform 3" in FIG. 5).

By way of example, each dynamic reliability model 502-506 can be a dynamic RBD model. Each reliability model 502-506 can model a reliability of a respective aerial vehicle. Each dynamic reliability model 502-506 can include block diagrams also known as nodes representative of systems of the aerial vehicle. For example, each system can be represented in the dynamic reliability model 400 as a corresponding node that can include multiple system components, labeled "System A," "System B," "System C," and "System D" in FIG. 5. In other examples, at least some of the dynamic reliability models 502-506 can include more or fewer systems as shown in the example of FIG. 5. In some examples, at least one of the systems of a corresponding dynamic reliability model 502-506 can correspond to the system disclosed herein with respect to FIG.

4. Each node of FIG. 5 of each dynamic reliability model 502-506 can include or be associated with a node reliability value representing an availability (e.g., probability) for a respective system of the aerial vehicle. By way of example, the node reliability value can correspond to a conditional reliability value for the respective system. In some examples, the reliability calculator 206 can be configured to execute each dynamic reliability model 502-506 to compute a vehicle reliability value for each aerial vehicle. The vehicle reliability value for each aerial vehicle can be representative of an availability (e.g., probability) of the respective aerial vehicle during the mission.

For example, the vehicle reliability value for the first aerial vehicle is shown at 508 as "0.75," the vehicle reliability value for the second aerial vehicle is shown at 510 as "0.80," and the vehicle reliability value for the third aerial vehicle is shown at 512 as "0.50." In some examples, the mission engine 230 can be configured to receive the vehicle reliability value for each aerial vehicle, such as shown in FIG. 5, and identify a given aerial vehicle of the first, second, and third aerial vehicles for implementing the mission as disclosed herein. In the example of FIG. 5, the given aerial vehicle is identified at 514. The mission engine 230 can be configured to generate the output data 238 identifying the given aerial vehicle, as disclosed herein.

Figure 6:
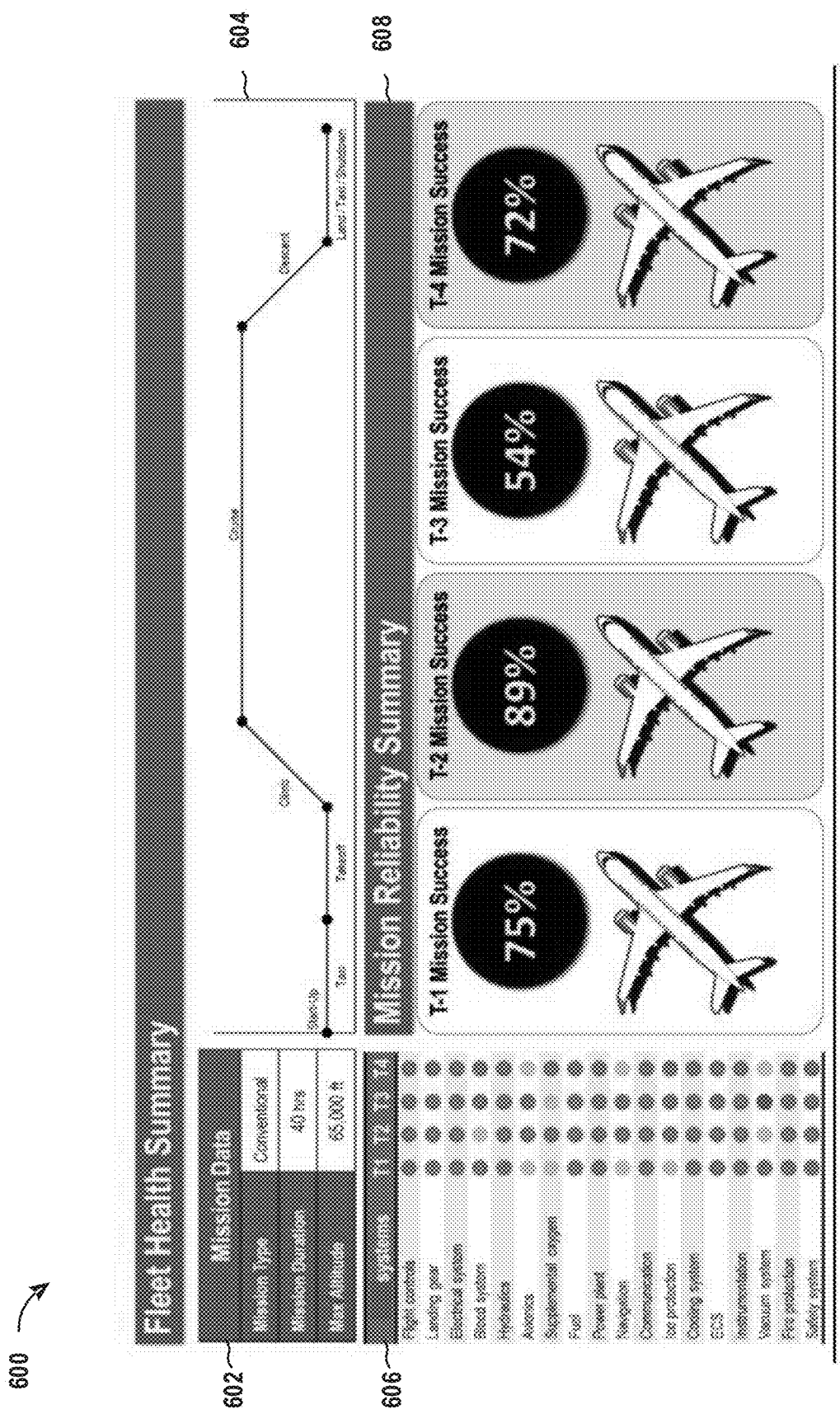
FIG. 6 is an example of a GUI for aerial vehicle fleet management.

FIG. 6 is an example of a GUI 600 for aerial vehicle fleet management. The GUI 600 can provide an indication of reliability and system viability of each aerial vehicle of a fleet of aerial vehicles for implementing a mission. The GUI 600 can be generated by the GUI generator 326, as shown in FIG. 3. The GUI 600 can be rendered on the output device 240, as shown in FIG. 2, or the output device 328, as shown in FIG. 3. Therefore, in some examples, reference can be made to the example of FIGS. 1-3 in the following description of the example of FIG. 6. The GUI generator 326 can be configured to generate the GUI 600 based on the output data 120, as shown in FIG. 1, the output data 238, as shown in FIG. 2, or the output data 324, as shown in FIG. 3. The GUI 600 can include a mission data object 602 that can identify a mission type, a mission duration, and a maximum altitude for the mission. In some examples, the GUI generator 326 can be configured to generate the mission data object based on the mission control data 320, as shown in FIG. 3. The GUI 600 can include a mission flight plan 604 for the mission. The mission flight plan 604 can represent phases of a selected aerial vehicle during the mission. The phases can include a taxi phase, a takeoff phase, a climb phase, a cruise phase, and a descent phase. In other examples, the mission flight plan 604 can include additional phases.

In some examples, the GUI 600 can include a system status object 606. The system status object 606 can provide an indication of reliability of each system of each aerial vehicle of the fleet of aerial vehicles. For example, each aerial vehicle of the fleet of aerial vehicles is identified as "T1," "T2," "T3," and "T4" in the example of FIG. 5. The reliability status for each system of each aerial vehicle at the system status object 606 can be differentiated with a different color shaded object, such as a circular object to provide an indication of system reliability. For example, a green color shaded object can be used to indicate that a respective system of a given aerial vehicle has a system reliability value greater than or equal to a first threshold (e.g., 0.75). A yellow color shaded object can be used to indicate that the respective system of the given aerial vehicle has a system reliability value that is less than the first threshold but greater than a second threshold (e.g., 0.50). A red color shaded object can be used to indicate that the respective system of the given aerial vehicle has a system reliability value that is less than or equal to the second threshold (e.g., 0.25). The system reliability value for the respective system of the given aerial vehicle can be computed by the reliability calculator 206. In some examples, the mission engine 230 can be programmed to evaluate the system reliability value for the respective system of the given aerial vehicle relative to the first, second, and third threshold to determine a corresponding color shaded object to represent a reliability of the respective system.

The system status object 606 can enable a user to efficiently identify systems of the aerial vehicles that require maintenance. For example, a vacuum system of the aerial vehicle identified as "T3" can be identified by the user via the system status object 606 as requiring maintenance based on the red color shaded object for the vacuum system. In some examples, the GUI 600 can include a mission reliability object 608. The mission reliability object 608 can include for each aerial vehicle of the fleet of aerial vehicles an indication of mission success, such as a probability of successfully completing the mission via a corresponding aerial vehicle. For example, the aerial vehicle identified as "T2" in the example of FIG. 6 can be selected for implementing the mission as this aerial vehicle has a greatest probability of successfully completing the mission in contrast to the remaining aerial vehicles of the fleet of aerial vehicles.

Figure 7:
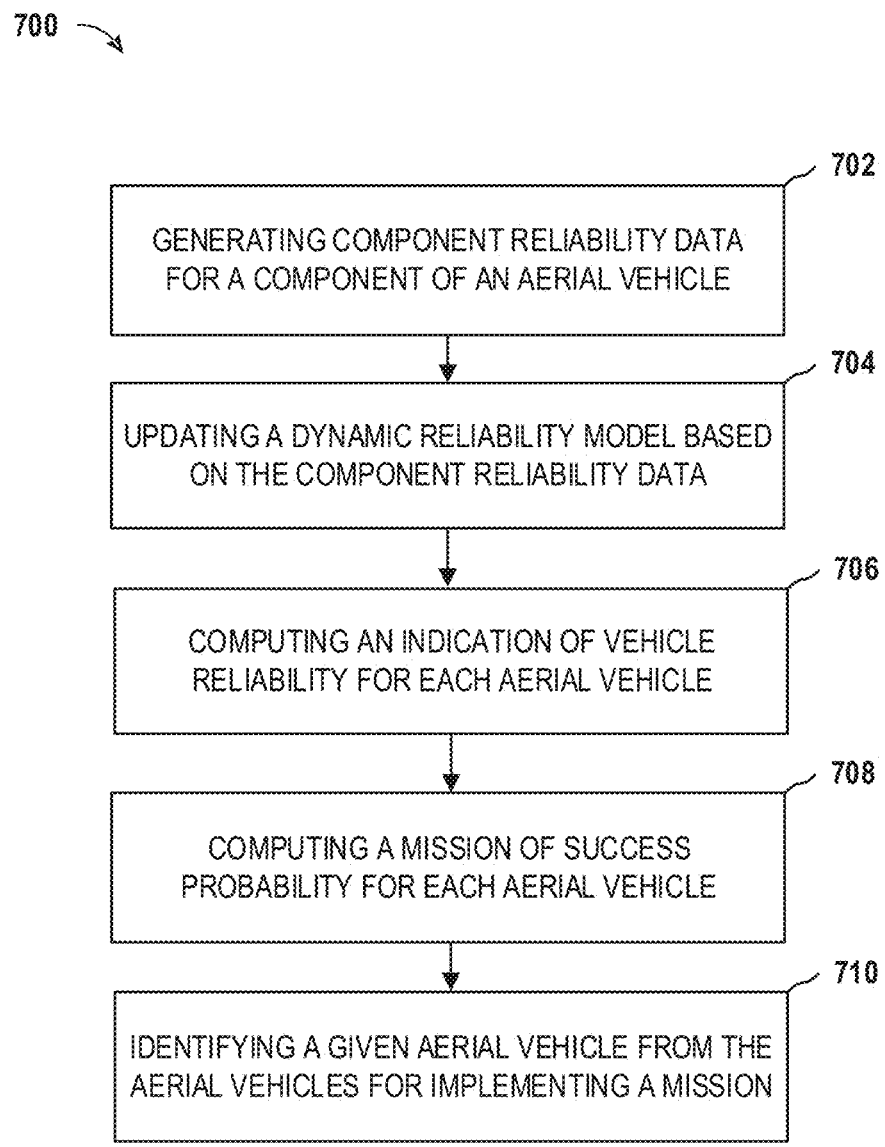
FIG. 7 is an example of a method for identifying an aerial vehicle for a mission.
Figure 8:
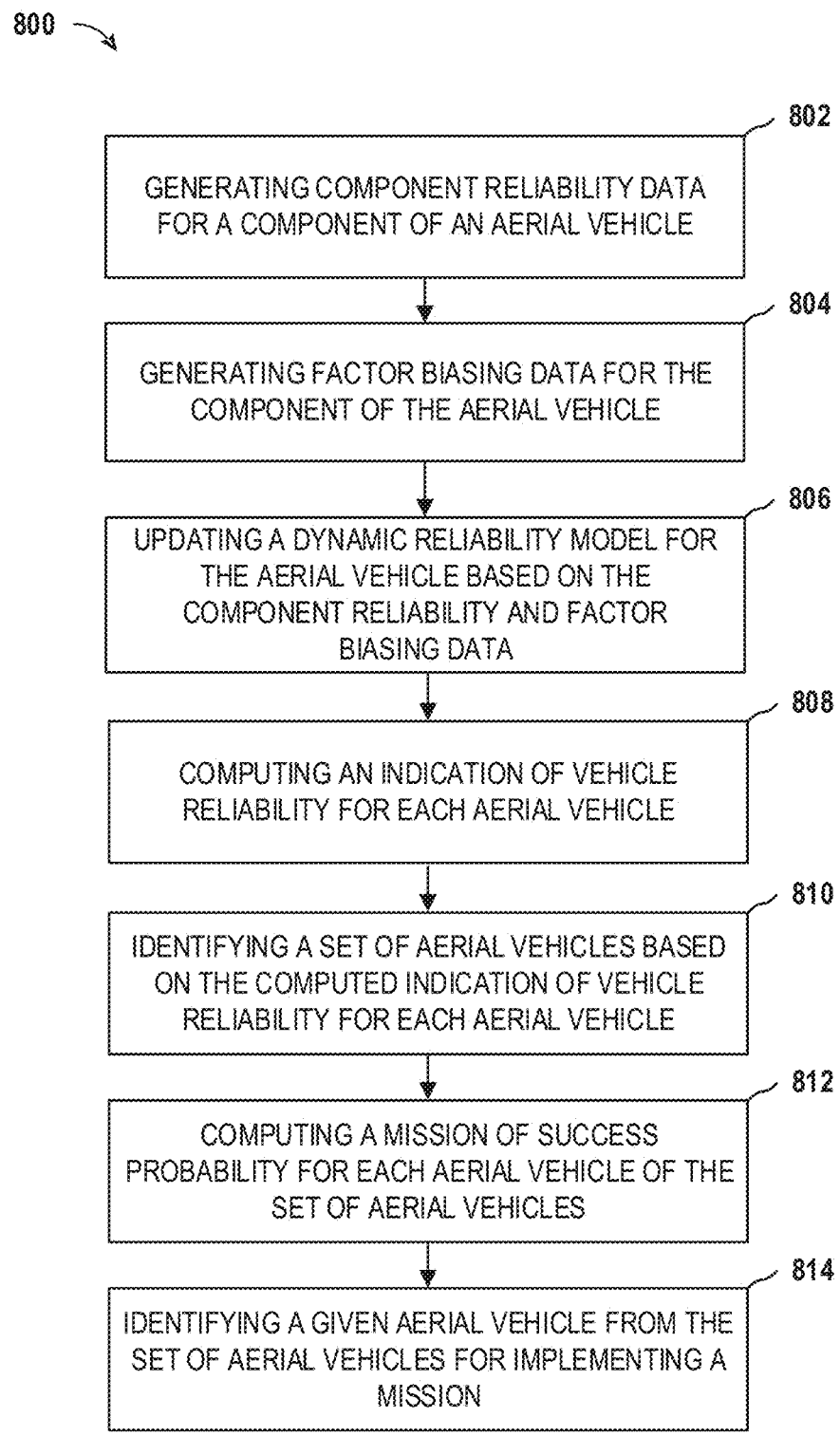
FIG. 8 is an example of another method for identifying an aerial vehicle for a mission.

In view of the foregoing structural and functional features described above, example methods will be better appreciated with references to FIGS. 7-8. While, for purposes of simplicity of explanation, the example method of FIGS. 7-8 are shown and described as executing serially, it is to be understood and appreciated that the example method is not limited by the illustrated order, as some actions could in other examples occur in different orders, multiple times and/or concurrently from that shown and described herein.

FIG. 7 is an example of a method 700 for identifying an aerial vehicle for a mission. The method 700 can be implemented by the system 100, as shown in FIG. 1, the system 200, as shown in FIG. 2, or the system 300, as shown in FIG. 3. Therefore, in some examples, reference can be made to the example of FIGS. 1-3 in the following description of the example of FIG. 7. The method 700 can begin at 702 by generating component reliability data (e.g., the component reliability data 212, as shown in FIG. 2) indicative of a reliability of a component of at least one aerial vehicle of aerial vehicles following one or more flights by the at least one aerial vehicle. The component reliability data can be generated by the component reliability module 218, as shown in FIG. 2.

At 704, updating (e.g., via the model adjustment engine 210, as shown in FIG. 2) a dynamic reliability model of dynamic reliability models (e.g., the dynamic reliability models 208, as shown in FIG. 2) for the at least one aerial vehicle based on the component reliability data. Each dynamic reliability model of the dynamic reliability models can characterize a reliability of one of the aerial vehicles. At 706, executing (e.g., via the reliability calculator 206, as shown in FIG. 2) each dynamic reliability model of the dynamic reliability models to compute an indication of vehicle reliability for each aerial vehicle. At 708, computing (e.g., via the mission engine 230, as shown in FIG. 2) a mission of success probability for each aerial vehicle of the aerial vehicles based on a respective indication of vehicle reliability. The mission of success probability for each aerial vehicle can be indicative of a likelihood that a respective aerial vehicle of the aerial vehicles can successfully complete the mission. At 710, identifying (e.g., via the mission engine 230, as shown in FIG. 2) a given aerial vehicle of the aerial vehicles for implementing the mission based on an evaluation of the mission of success probability for each aerial vehicle of the aerial vehicles.

FIG. 8 is an example of another method 800 for identifying an aerial vehicle for a mission. The method 800 can be implemented by the system 100, as shown in FIG. 1, the system 200, as shown in FIG. 2, or the system 300, as shown in FIG. 3. Therefore, in some examples, reference can be made to the example of FIGS. 1-3 in the following description of the example of FIG. 7. The method 800 can begin at 802 by generating component reliability data (e.g., the component reliability data 212, as shown in FIG. 2) indicative of a reliability of a component of at least one aerial vehicle of aerial vehicles following one or more flights by the at least one aerial vehicle. The component reliability data can be generated by the component reliability module 218, as shown in FIG. 2. At 804, generating factor biasing data (e.g., biasing data 214, as shown in FIG. 1) indicative of an influence that weather or ambient conditions had on the component during the one or more flights by the at least one aerial vehicle. The factor biasing data can be generated by the external factor biasing module 222, as shown in FIG. 2.

At 806, updating (e.g., via the model adjustment engine 210, as shown in FIG. 2) a dynamic reliability model of dynamic reliability models (e.g., the dynamic reliability models 208, as shown in FIG. 2) for the at least one aerial vehicle based on the component reliability data. Each dynamic reliability model of the dynamic reliability models can characterize a reliability of one of the aerial vehicles. At 808, executing (e.g., via the reliability calculator 206, as shown in FIG. 2) each dynamic reliability model of the dynamic reliability models to compute an indication of vehicle reliability for each aerial vehicle. At 810, evaluating (e.g., via the mission engine 230, as shown in FIG. 2) the indication of vehicle reliability for each aerial vehicle relative to a vehicle reliability threshold to identify a set of aerial vehicles of the aerial vehicles for the mission. At 812, computing (e.g., via the mission engine 230, as shown in FIG. 2) a mission of success probability for each aerial vehicle of the set of aerial vehicles based on a respective indication of vehicle reliability. The mission of success probability can be indicative of a likelihood that a corresponding aerial vehicle of the set of aerial vehicles can successfully complete a mission. At 814, identifying a given aerial vehicle of the set of aerial vehicles for implementing the mission based on an evaluation of the mission of success probability for each aerial vehicle of the set of aerial vehicles.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer-implemented method comprising:
generating component reliability data indicative of a reliability of a component of an aerial vehicle of a plurality of aerial vehicles in a standby configuration based on a current age of the component, by utilizing a machine learning algorithm;
updating a dynamic reliability model of a plurality of dynamic reliability models for the aerial vehicle based on the component reliability data, each dynamic reliability model of the plurality of dynamic reliability models characterizing a reliability of one of the plurality of aerial vehicles, wherein each dynamic reliability model of the plurality of dynamic reliability models identifies a logical and/or functional connection between components of a respective aerial vehicle and wherein updating the dynamic reliability model includes updating a node reliability value for a respective component of the dynamic reliability model to the component reliability data;
identifying a subset of aerial vehicles of the plurality of aerial vehicles in the standby configuration that comprises a mission critical component in a reliable state, based on a fleet analysis of the plurality of dynamic reliability models;
executing each dynamic reliability model of the plurality of dynamic reliability models to compute an indication of vehicle reliability for each aerial vehicle of the plurality of aerial vehicles;
computing a mission of success probability for each aerial vehicle of the plurality of aerial vehicles based on a respective indication of vehicle reliability;
outputting the mission of success probability for each aerial vehicle of the plurality of aerial vehicles on a graphical user interface (GUI), the GUI including a mission reliability object indicating the mission of success probability for each aerial vehicle of the plurality of aerial vehicles, a system status object that indicates a status of a plurality of systems associated with each aerial vehicle of the plurality of aerial vehicles and a mission flight plan indicating phases of a selected aerial vehicle during a mission;
identifying a given aerial vehicle of the plurality of aerial vehicles for implementing the mission based on an evaluation of the mission of success probability for each aerial vehicle of the plurality of aerial vehicles; and
selecting the aerial vehicle of the plurality of aerial vehicles in the standby configuration that provide a greatest probability of mission success for execution of the mission.

2. The computer-implemented method of claim 1, further comprising generating factor biasing data indicative of an influence that weather or ambient conditions had on the component during one or more flights by the aerial vehicle, wherein the dynamic reliability model for the aerial vehicle is further updated based on the factor biasing data.

3. The computer-implemented method of claim 2,
wherein the component reliability data is generated by a first machine learning algorithm configured to predict the reliability of the component of the aerial vehicle based on component data characterizing one of a current age of the component, historical failures of the component, and observed survivors for the component, and
wherein the factor biasing data is generated by a second machine learning algorithm configured to predict the influence that the weather or ambient conditions had on the component during one or more flights by the aerial vehicle.

4. The computer-implemented method of claim 3, further comprising:
generating output data comprising the mission of success probability for each aerial vehicle of the plurality of aerial vehicles; and
causing the output data to be displayed on an output device to provide a visualization of the mission of success probability for each aerial vehicle of the plurality of aerial vehicles.

5. The computer-implemented method of claim 3, receiving system status data indicative of a system operational state of one or more systems of the aerial vehicle, at least one of the systems comprising the component, wherein the dynamic reliability model for the aerial vehicle is further updated based on the system status data.

6. The computer-implemented method of claim 5, wherein computing the mission of success probability for each aerial vehicles of the plurality of aerial vehicles comprises:
evaluating the indication of vehicle reliability for each aerial vehicle of the plurality of aerial vehicles relative to a vehicle reliability threshold to identify a set of aerial vehicle of the plurality of aerial vehicles for the mission; and
computing the mission of success probability for each aerial vehicle of the set of aerial vehicles based on a respective indication of vehicle reliability.

7. The computer-implemented method of claim 6, wherein identifying the given aerial vehicle of the plurality of aerial vehicles for implementing the mission comprises identifying the given aerial vehicle from the set of aerial vehicles for implementing the mission based on the evaluation of the mission of success probability for each aerial vehicle of the set aerial vehicles.

8. The computer-implemented method of claim 6, further comprising receiving mission control data indicative of one of a duration of the mission and a vehicle selection threshold, the given aerial vehicle of the set of aerial vehicles being identified further based on the mission control data.

9. The computer-implemented method of claim 8, wherein identifying the given aerial vehicle of the set of aerial vehicles for implementing the mission comprises evaluating the mission of success probability for each aerial vehicle of the set aerial vehicles relative to the vehicle selection threshold of the mission control data to identify the given aerial vehicle.

10. The computer-implemented method of claim 8, wherein identifying the given aerial vehicle of the set of aerial vehicles for implementing the mission comprises:
determining an amount of flight time for each aerial vehicle of the set of aerial vehicles based on flight time data for each of the set of aerial vehicles; and
identifying the given aerial vehicle of the set of aerial vehicles for implementing the mission in response to determining that a corresponding amount of flight time for the given aerial vehicle is greater than or equal to the duration of the mission control data.

11. The computer-implemented method of claim 8, wherein the mission control data further comprises a mission stress factor threshold indicative of a mission type of the mission, wherein identifying the given aerial vehicle of the set of aerial vehicles for implementing the mission comprises evaluating the mission of success probability for each aerial vehicle of the set aerial vehicles relative to the mission stress factor threshold of the mission control data to identify the given aerial vehicle.

12. The computer-implemented method of claim 8, further comprising computing mission drivers based on the dynamic reliability model for each aerial vehicle of the set of aerial vehicles, the mission drivers identifying one or more components and/or systems of a respective aerial vehicle of the set of aerial vehicles that have a greatest impact on the respective aerial vehicle successfully completing the mission.

13. The computer-implemented method of claim 12, wherein computing the mission drivers comprises evaluating node reliability values of each dynamic reliability model for each aerial vehicle of the set of aerial vehicles to identify respective nodes representative of the one or more components and/or systems of the respective aerial vehicle as having the greatest impact on the respective aerial vehicle successfully completing the mission.

14. The computer-implemented method of claim 12, further comprising computing maintenance drivers based on the dynamic reliability model for each aerial vehicle of the set of aerial vehicles, the maintenance drivers identifying one or more components or systems of a corresponding aerial vehicle requiring maintenance.

15. The computer-implemented method of claim 12, wherein computing the mission maintenance drivers comprises evaluating node reliability values of each dynamic reliability model for each aerial vehicle of the set of aerial vehicles to identify respective nodes representative of the one or more components and/or systems of the corresponding aerial vehicle that have a node reliability value that is less than or equal to a maintenance threshold.

16. A system comprising:
memory to store machine readable instructions and data, the data comprising component reliability data indicative of a reliability of a component of an aerial vehicle of a plurality of aerial vehicles in a standby configuration, the component reliability data being generated based on a current age of the component, by utilizing a machine learning algorithm, factor biasing data indicative of an influence that weather or ambient conditions had on the component during one or more flights by the aerial vehicle, and a plurality of dynamic reliability models characterizing a reliability of one of the plurality of aerial vehicles in the standby configuration, wherein each dynamic reliability model of the plurality of dynamic reliability models identifies a logical and/or functional connection between components of a respective aerial vehicle;
one or more processors to access the memory and execute the machine readable instructions, the machine readable instructions comprising:
a model adjustment engine programmed to update a dynamic reliability model of the plurality of dynamic reliability models for the aerial vehicle based on the component reliability data and the factor biasing data, wherein updating the dynamic reliability model includes updating a node reliability value for a respective component of the dynamic reliability model to the component reliability data;
a reliability calculator programmed to execute each dynamic reliability model of the plurality of dynamic reliability models to compute an indication of vehicle reliability for each aerial vehicle of the plurality of aerial vehicles in the standby configuration;

a mission engine programmed to compute a mission of success probability for each aerial vehicle of the plurality of aerial vehicles in the standby configuration based on a respective indication of vehicle reliability and identify a given aerial vehicle of the plurality of aerial vehicles in the standby configuration for implementing the mission based on an evaluation of the mission of success probability for each aerial vehicle of the plurality of aerial vehicles in the standby configuration, wherein the mission engine identifies a subset of aerial vehicles of the plurality of aerial vehicles in the standby configuration comprising a mission critical component in a reliable state, based on a fleet analysis of the plurality of dynamic reliability models, and wherein the mission engine selects the aerial vehicle of the plurality of aerial vehicles in the standby configuration that provide a greatest probability of mission success for execution of the mission; and a graphical user interface (GUI) generator programmed to generate a GUI including a mission reliability object indicating the mission of success probability for each aerial vehicle of the plurality of aerial vehicles, a system status object that indicates a status of a plurality of systems associated with each aerial vehicle of the plurality of aerial vehicles and a mission flight plan indicating phases of a selected aerial vehicle during a mission.

17. The system of claim 16, wherein the machine readable instructions further comprise:
a first machine learning algorithm programmed to predict the reliability of the component of the aerial vehicle based on component data characterizing one of a current age of the component, historical failures of the component, and observed survivors for the component; and
a second machine learning algorithm programmed to predict the influence that the weather or ambient conditions had on the component during one or more flights by the aerial vehicle.

18. The system of claim 16,
wherein the mission engine is programmed to:
compute mission drivers based on the dynamic reliability model for each aerial vehicle of the plurality of aerial vehicles, the mission drivers identifying one or more components and/or systems of a respective aerial vehicle of the plurality of aerial vehicles that have a greatest impact on the respective aerial vehicle successfully completing the mission;
compute maintenance drivers based on the dynamic reliability model for each aerial vehicle of the plurality of aerial vehicles, the maintenance drivers identifying one or more components or systems of a corresponding aerial vehicle requiring maintenance;
wherein the machine readable instructions further comprise a graphical user interface generator programmed to:
generate output data comprising the mission of success probability for each aerial vehicle of the plurality of aerial vehicles, the mission drivers and the maintenance drivers; and
cause the output data to be displayed on an output device to provide a visualization of the mission of success probability for each aerial vehicle of the plurality of aerial vehicles, the mission drivers, and the maintenance drivers.

19. A computer-implemented method comprising:
generating component reliability data indicative of a reliability of a component of an aerial vehicle of a plurality of aerial vehicles following one or more flights by the aerial vehicle based on a current age of the component, by utilizing a machine learning algorithm;
generating factor biasing data indicative of an influence that weather or ambient conditions had on the component during the one or more flights by the aerial vehicle;
updating a dynamic reliability model of a plurality of dynamic reliability models for the aerial vehicle based on the component reliability data and the factor biasing data, each dynamic reliability model of the plurality of dynamic reliability models characterizing a reliability of one of the plurality of aerial vehicles, wherein each dynamic reliability model of the plurality of dynamic reliability models identifies a logical and/or functional connection between components of a respective aerial vehicle and wherein updating the dynamic reliability model includes updating a node reliability value for a respective component of the dynamic reliability model to the component reliability data;
executing each dynamic reliability model of the plurality of dynamic reliability models to compute an indication of vehicle reliability for each aerial vehicle of the plurality of aerial vehicles;
identifying a subset of aerial vehicles of the plurality of aerial vehicles comprising a mission critical component, based on an analysis of the plurality of dynamic reliability models;
evaluating the indication of vehicle reliability for each aerial vehicle relative to a vehicle reliability threshold to identify a set of aerial vehicles of the aerial vehicles for the mission;
computing a mission of success probability for each aerial vehicle of the set of aerial vehicles based on a respective indication of vehicle reliability;
outputting the mission of success probability for each aerial vehicle of the set of aerial vehicles on a graphical user interface (GUI), the GUI including a mission reliability object indicating the mission of success probability for each aerial vehicle of the set of aerial vehicles, a system status object that indicates a status of a plurality of systems associated with each aerial vehicle of the plurality of aerial vehicles and a mission flight plan indicating phases of a selected aerial vehicle during a mission; and
identifying a given aerial vehicle of the set aerial vehicles for implementing the mission based on an evaluation of the mission of success probability for each aerial vehicle of the set of aerial vehicles.

20. The computer-implemented method of claim 19, wherein the mission of success probability for each aerial vehicle of the set aerial vehicles is evaluated relative to a vehicle selection threshold to identify the given aerial vehicle.

* * * * *